(12) United States Patent
Makar et al.

(10) Patent No.: US 6,708,203 B1
(45) Date of Patent: Mar. 16, 2004

(54) METHOD AND SYSTEM FOR FILTERING MESSAGES BASED ON A USER PROFILE AND AN INFORMATIONAL PROCESSING SYSTEM EVENT

(75) Inventors: Michael G. Makar, Boca Raton, FL (US); Joseph M. Mosley, Boca Raton, FL (US); Tracy A. Tindall, Plantation, FL (US)

(73) Assignee: The DelFin Project, Inc., Boca Raton, FL (US)

( * ) Notice: Subject to any disclaimer, the term of this patent is extended or adjusted under 35 U.S.C. 154(b) by 0 days.

(21) Appl. No.: 09/348,218

(22) Filed: Jul. 6, 1999

Related U.S. Application Data

(63) Continuation-in-part of application No. 09/113,453, filed on Jul. 10, 1998, now Pat. No. 6,067,570.
(60) Provisional application No. 60/062,600, filed on Oct. 20, 1997.

(51) Int. Cl.[7] .............................................. G06F 15/16
(52) U.S. Cl. ....................... 709/206; 709/203; 709/207; 709/218; 707/6
(58) Field of Search ................................. 709/203, 206, 709/207, 218, 246; 707/6, 10, 102, 103, 104

(56) References Cited

U.S. PATENT DOCUMENTS

| | | | | |
|---|---|---|---|---|
| 4,945,412 A | * | 7/1990 | Kramer | |
| 5,289,168 A | | 2/1994 | Freeman | |
| 5,437,050 A | * | 7/1995 | Lamb et al. | |
| 5,572,643 A | | 11/1996 | Judson | |
| 5,754,939 A | * | 5/1998 | Herz et al. | |
| 5,797,001 A | * | 8/1998 | Augenbraun et al. | |
| 5,809,242 A | | 9/1998 | Shaw et al. | |
| 5,838,790 A | | 11/1998 | McAuliffe et al. | |
| 5,848,396 A | * | 12/1998 | Gerace | |
| 5,848,397 A | | 12/1998 | Marsh et al. | |
| 5,854,897 A | * | 12/1998 | Radziewicz et al. | |
| 5,913,030 A | * | 6/1999 | Lotspiech et al. | 709/203 |
| 5,913,040 A | * | 6/1999 | Rakavy et al. | |
| 5,913,212 A | * | 6/1999 | Sutcliffe et al. | 707/6 |
| 5,933,822 A | * | 8/1999 | Braden-Harder et al. | |
| 5,974,398 A | * | 10/1999 | Hanson et al. | |
| 6,012,083 A | * | 1/2000 | Savitzky et al. | |
| 6,029,195 A | * | 2/2000 | Herz | |
| 6,064,967 A | * | 5/2000 | Speicher | |
| 6,085,226 A | * | 7/2000 | Horvitz | 709/203 |
| 6,092,197 A | * | 7/2000 | Coueignoux | |
| 6,098,106 A | * | 8/2000 | Philyaw et al. | |
| 6,128,655 A | * | 10/2000 | Fields et al. | |
| 6,169,542 B1 | * | 1/2001 | Hooks et al. | |
| 6,183,366 B1 | * | 2/2001 | Goldberg et al. | |
| 6,185,586 B1 | * | 2/2001 | Judson | |
| 6,185,603 B1 | * | 2/2001 | Henderson et al. | 709/206 |

(List continued on next page.)

*Primary Examiner*—Le Hien Luu
*Assistant Examiner*—Stephan Willeh
(74) *Attorney, Agent, or Firm*—Jon A. Gibbons; Fleit, Kain, Gibbons, Gutman, Bongini & Bianco P.L.

(57) ABSTRACT

A method is illustrated in the flow diagram 100 of FIG. 1. A processor 1001 renders a message 1025 for the processor operator's education during times of processor latency 1015, such as dialing onto any network, such as the Internet. This wait time 1017 is normally non-productive, and therefore can be used in such a way as to be non-invasive. It is also understood that this time is short, so as to make other actions, such as getting up from the desk, not attractive. Finally, even if the wait time was, or became, very short, the present invention provides the first message 1025 to the process operator that has been filtered. This filtering is a balance of the message owner's willingness to out bid other messages, the time of the day, the location of the operator, and finally the operator's likes and dislikes.

36 Claims, 29 Drawing Sheets

U.S. PATENT DOCUMENTS

| | | | |
|---|---|---|---|
| 6,199,076 B1 * | 3/2001 | Logan et al. | |
| 6,212,554 B1 * | 4/2001 | Roskowski | |
| 6,249,282 B1 * | 6/2001 | Sutcliffe et al. | 707/6 |
| 6,260,192 B1 * | 7/2001 | Rosin et al. | |
| 6,264,560 B1 * | 7/2001 | Goldberg et al. | |
| 6,275,824 B1 * | 8/2001 | O'Flaherty et al. | 707/10 |
| 6,286,005 B1 * | 9/2001 | Cannon | |
| 6,286,045 B1 * | 9/2001 | Griffiths et al. | |
| 6,298,330 B1 * | 10/2001 | Gardenswartz et al. | |
| 6,301,347 B1 * | 10/2001 | Tuokkola et al. | |
| 6,317,722 B1 * | 11/2001 | Jacobi et al. | |
| 6,317,742 B1 * | 11/2001 | Nagaratnam et al. | 707/10 |
| 6,327,574 B1 * | 12/2001 | Kramer et al. | |
| 6,330,592 B1 * | 12/2001 | Makuch et al. | |
| 6,366,912 B1 * | 4/2002 | Wallent et al. | |
| 6,393,421 B1 * | 5/2002 | Paglin | 707/10 |
| 6,438,544 B1 * | 8/2002 | Grimmer et al. | 707/9 |
| 6,442,748 B1 * | 8/2002 | Bowman-Amuah | |

* cited by examiner

An Operating System Start Screen

FIG. 4.

An Operating System
Shut Down Screen

FIG. 5.

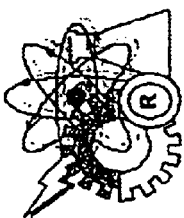
FIG. 19

| | 2602 | 2604 | 2606 | 2608 | 2612 |
|---|---|---|---|---|---|
| Name | 2605 | Book Shop | Pizza Shop | Sub Shop | Dept Store |
| File Name | 2610 | http://www.BooksShop.com/spanish boating/ad | http://www.PizzaShop.com/ad/Lunch | http://www.SubShop.com/ad/Lunch | http://www.DeptStore.com/French/Jogging/ad |
| Start Date/Time | 2615 | 1/1/1999-10:00 | 01/01/99-11:00 | 01/01/99-11:00 | 01/01/99-00:00 |
| End Date/Time | 2620 | 02/01/99-18:00 | 02/01/99-14:00 | 12/31/99-16:00 | 12/31/99-24:00 |
| Platform | 2625 | PC | Mac | Cell Fone | PC |
| Provider | 2627 | The Delfin Project | The Delfin Project | The Delfin Project | The Delfin Project |
| Action | 2630 | on | any | any | any |
| Area Code | 2630 | 561 | 561 | 561 | 0 |
| Zip | 2635 | 33432 | 33432 | 0 | 0 |
| Repetition | 2640 | once | once/day | always | always |
| Series | 2645 | 1 of 3 | 1 | 1 of 2 | 1 of 9 |
| Who | 2650 | Dad | Mom | Any | Any |
| Income | 2655 | 40K | 50K | 90K | 20K |
| Target Group | 2660 | South American | Any | Any | Canadian |
| Language | 2665 | Spanish | English | English | French |
| Interest / Disinterests | 2670 | Books | Fast Food | Fast Food | Any |
| Behavior | 2675 | Yahoo | Micro Soft | Email | Auction |
| Attitude | 2680 | Shopping | Hungry | Hungry | Any |
| Event | 2685 | No | No | No | Yes |
| $$$$ | 2690 | 3 | 4 | 4 | 6 |
| Priority | 2695 | 2 | 4 | 1 | 3 |

FIG. 26

| | 2802 | 2804 | 2806 | 2808 |
|---|---|---|---|---|
| Name (2805) | Name | Jose | Marie | Family |
| File Name (2810) | File Name | Jose.xls | Marie.xls | Family.xls |
| Date (2815) | Date | 5/30/99 | 8/13/99 | 8/13/99 |
| Platform (2820) | Platform | PC | PC | PC |
| Provider (2825) | Provider | the Delfin Project | the Delfin Project | the Delfin Project |
| Area Code (2830) | Area Code | 561 | 561 | 561 |
| Zip (2835) | Zip | 33432 | 33432 | 33432 |
| Who (2840) | Who | Dad | Mom | Family |
| Income (2845) | Income | 40k | 20k | 60k |
| Target Group (2850) | Target Group | Boating | Tennis | Tennis, Boating |
| Language (2855) | Language | Spanish | French | Spanish, French |
| Interest / Disinterests (2860) | Interest / Disinterests | Sail Boats | Jogging | Sailboats, Jogging |
| Behavior (2865) | Behavior | Ford Home Page | Nike Home page | Ford Home Page, Nike Home Page |
| Event (2870) | Event | Storm Warning | none | Storm Warning |

FIG. 28

| | 2902 | 2904 | 2906 |
|---|---|---|---|
| 2905 | Name | Book Shop | Dept Store |
| 2910 | File Name | http://www.BooksShop.com/spanish/boating/ad | http://www.DeptStore.com/French/Jogging/ad |
| 2915 | Start Date/Time | 1/1/1999- 10:00 | 01/01/99-00:00 |
| 2920 | End Date/Time | 02/01/99-18:00 | 12/31/99-24:00 |
| | Platform | PC | PC |
| 2925 | Provider | The DelFin Project | The DelFin Project |
| 2927 | Action | on | any |
| 2930 | Area Code | 561 | 0 |
| 2935 | Zip | 33432 | 0 |
| 2940 | Repetition | once | always |
| 2945 | Series | 1 of 3 | 1 of 1 |
| 2950 | Who | Dad | Any |
| 2955 | Income | 40k | 20k |
| 2960 | Target Group | Boating | Tennis |
| 2965 | | | |
| 2970 | Language | Spanish | French |
| 2975 | Interest / Disinterests | Sail Boats | Jogging |
| 2980 | Behavior | Amazon | Nike Home page |
| | Attitude | Shopping | Any |
| 2985 | Event | Strom Warnings | No |
| 2990 | $$$$ | 3 | 6 |
| 2995 | Priority | 2 | 3 |
| 2997 | | | |

FIG. 29

| | Name | File Name | Date/Time | Duration | Platform | Provider | Action | Area Code | Zip | Repetition | Series | Who | Income | Target Group | Language | Interest / Disinterests | Behavior | Attitude | Event | $$$$ | Priority |
|---|---|---|---|---|---|---|---|---|---|---|---|---|---|---|---|---|---|---|---|---|---|
| 3004 | Book Shop | http://www.BooksShop.com/spanish/boating/ad | 1/2/99 8:00 | 15 | PC | The Delfin Project | on | 561 | 33432 | once | 1 of 3 | Jose | X | X | Spanish | X | X | X | No | 3 | 2 |
| 3006 | Dept Store | http://www.DeptStore.com/French/Jogging/ad | 1/1/99 8:30 | 22 | PC | The Delfin Project | off | 561 | 33432 | always | 1 | Maria | X | X | X | X | X | X | No | 6 | 3 |

FIG. 30

METHOD AND SYSTEM FOR FILTERING MESSAGES BASED ON A USER PROFILE AND AN INFORMATIONAL PROCESSING SYSTEM EVENT

CROSS-REFERENCE TO RELATED APPLICATIONS

This is a continuation-in-part of non-provisional patent application Ser. No. 09/113,453 filed Jul. 10, 1998 now U.S. Pat. No. 6,067,570, which is based on the provisional patent application Ser. No. 60/062,600 to Vadim Kreynin et al., for "A Method and System for Displaying and Interacting With an Informational Message Based on an Information Processing System Event" filed Oct. 20, 1997, which is commonly assigned herewith to The DelFin Project, Inc. and which is incorporated hereinto in its entirety by reference.

BACKGROUND OF THE INVENTION

1. Field of the Invention

Broadly this invention relates to computers and operator interfaces. More particularly, this invention relates to the field of interaction between a class of microprocessor-based machines including computers and consumer electronics, and operator(s) of these microprocessor-based machines during the times of operator-machine latency.

2. Description of the Related Art

The field of computers and operator interfaces continues to develop. The typical components of a personal computer will be briefly reviewed. FIG. 2 is a block diagram of the principal components of a personal computer (PC) 200. The PC's processing is controlled by a central processing unit (CPU) 203. The CPU 203 receives its electrical power from a power supply 205 and its performance is, at least in part, determined by the speed of a clocking 207. The CPU 203 must control the data and process it as it is passed from the input/output controller 215 and the memory controller 209. The memory controller interfaces between the dynamic random access memory (DRAM) 213 and the read only memory (ROM) 211. The input/output controller 215 interfaces with a feature bus 217. On a feature bus there may be any type of optional non-volatile data storage, optional communication device, or optional processing control devices. The non-volatile types of storage are either non-removable, such as a hard disk drive 223, or removable, such as a PCMCIA card or smart card port 225 (credit card size cards), removable media drive 221, which accepts such media as a floppy disk 245 CD (compact disks), Zip™ disks, or, in fact, any type or kind of removable media. Optional high speed communication with a PC is accomplished using wired ports, such as a serial or parallel port 227, or an universal serial bus (USB) 231, or local area network (LAN) connection 233. Optional wireless communication with the PC 200 is accomplished by such ports as an infra-red data attached (IRDA) port 229. The operator receives real time processing results from the multimedia Interface 235, which are the combinations of the PC display and the speaker(s). The operator controls the PC by a Keyboard and mouse 219. This entire system, known as a hardware platform 237 must work in cooperation with a PC operating system 239. Operating systems include Microsoft Windows NT, Apple System 7, IBM OS/2, or equivalent. Application software 243 is any program designed to run on a PC operating system 239. In addition, the application software stores on the Hard Disk Drive certain files or messages 241, such as the operating system 239 and start and stop screens.

The operations of the principal components of the hardware platform 237, operating system 239, and applications software 243 are well known. The cold boot-up of a PC, such as PC hardware platform 237, is known. It should be understood that the principal components of the PC 200 are not limited to any specific hardware platform 237, or specific operating system 239, or specific application 243. The PC 200 can be implemented in a wide a variety of hardware, operating system or software, within the true scope and spirit of the present invention.

A variety of applications 243 can run on the PC hardware platform 237. One example application is a word processing program. If the PC is used for word processing, the user enters text. Thereafter, changes and improvements are made and printed very easily without re-typing the entire document. However, the user must wait for this printing. There are other examples of PC applications, including spreadsheets that speed up accounting, and database programs that track data, and graphic programs that ease and improve presentation and publishing. In all cases there are times of waiting, be it during the start of the application, printing, calculations, file management, communication with other devices and other microprocessor-based events.

Many people would argue that as PC technology continues to improve the hardware and software, the operations will be faster and there will be less waiting. However as most of the PC market place upgraded from DOS, to Windows 3.x, and then to Windows 95 operating systems, the waiting became even longer. The simple operation of turning starting-up or shuttling-down the PC 200 can take several minutes each day.

FIG. 3 illustrates a flow diagram of the PC of FIG. 2 during a cold start-up or boot-up 300. During this start-up flow, the PC user is waiting for the machine to finish the start-up flow of FIG. 3. This wait time for a cold start up can take several minutes. The flow diagram begins with step 301, wherein the user decides to start the PC from a completely powered off state. The power is turned on and a self-test and BIOS software routines are completed 303. Then the operating system "Start screen" graphic is displayed on the screen 305. For example, "Start Screen" or "Splash Screen" is a well known Microsoft Windows 95 banner. FIG. 4 contains an example of this. The PC operator must wait for the completion of the loading of the operating system 307, during this time the operator is viewing FIG. 4. Finally, the "Start" screen is replaced with the PC's "desk Top" 309. The user is provided only the status of the PC starting, and no other additional information to inform, to entertain, or to educate the user during this start-up process. Accordingly, a need exists to provide a PC user during startup additional information.

During shutdown of a PC, a similar scenario happens. When the operator decides to turn off the PC, such as preformed in Windows 95 or Windows NT, the operator clicks on "Start", then "Shut-down". Then, the operator views a screen such as that shown in FIG. 5, which contains the Windows shut-down screen, during the shut down of the operating system. The time period for shut down can range from several seconds to several minutes depending on the hardware platform 237 and associated operating system 239. The user is provided information only on the status of the shutdown process. No other information is provided, therefore it would be desirable to better utilize the time spent during shut down.

FIG. 6 illustrates a the principal components of a TV 600. The operation of a TV is well understood. The TV's electronics 603 is almost a completely analog mixed signal, however, modern TV's have such functions as picture in a picture and, in fact, in the future will be converted totally to digital with the up coming High Definition Television (HDTV). The TV has an electrical power supply 617. The TV has a video display 605. The TV provides for audio with one or more speakers 607. The TV has a TV control unit 609, which is the TV channel selector, volume, and other user settings. The TV must receive a signal, which may real time (live) broadcasts from an antenna, cable, or satellite 611. Alternatively, the TV may have a pre-recorded input from a VCR or digital video disk (DVD) 613 input. Finally, the TV may have an optional remote control 615.

When a TV is powered on, there is a brief wait as the TV's electronics and display tube heats up and the picture comes into focus. During this time the TV operator is waiting for confirmation that the TV is displaying the desired program. Once the TV is viewed to be on by the operator, there may be additional waiting if the user then selects a pay-per-view TV program. This wait can take thirty seconds to a minute. The user is presented no additional information, to entertain or to educate them. Accordingly, a need exists to provide TV users additional information during idle time.

FIG. 7 illustrates the principal components of a telephone 700. The phone electronics 701 sends and receives information from the antenna or wire connection 703. This information is decoded from an analog or digital signal, presented to a speaker 705, and gathered from a microphone 707. The key pad 709 is used to "dial", and for interfacing with the phone. The power is supplied from the wired connection, or, for the wireless phone, the power is from a battery 711. Finally, most phones have a display 713 for visual presentation of information. When a call is placed, there is a minor wait as the call is being routed. The time to connection is largely based on the number of public telephone switches the call must be routed through, combined with how long the person being called takes to pick up the receiver. This time may take several seconds to a minute. The caller has little to do but to wait for the called phone to be answered. No other information is provided. Therefore, a need exists to provide the caller with additional information during idle time to inform, to entertain, or to educate the caller.

FIG. 8 illustrates the major components of a microprocessor-based appliance. Today, electronic appliances are very sophisticated. Appliances not only save time and money but provide convenience to the operators of these appliances. Examples are: radio receivers, microwave ovens, audio and video players, such as CD players, ATMs (Automated Teller Machines) and gasoline pumps with a pay at the pump credit card reader. In all cases, these appliances are under the control of a microprocessor. The microprocessor is directed by the appliance operator. Referring to FIG. 8, the microprocessor and electronics 801 receive commands from the appliance operator through the controls 807. The microprocessor and electronics 801 may send, and or, receive information from optional communications 803. Other electronic appliances are product dispenser machines; including vending machines, ticket machines, and any other electronic machines used by the public to provide a product. The product dispenser machine generally prompts a user or operator for a PIN (Personal Identification Number) and a credit card, bank card, or equivalent. The product dispenser communicates the PIN and the card authorization. The CD, DVD player and microwave may not have any communication capability. However, note that it is common for a CD player to be integrated with a radio. This entire unit is powered by the power supply 811. During the request for service from the microprocessor, the operator interacts with the appliance using the speaker and display 805. Typically, the appliance is programmed to interact with a user through the product interface 809. The appliance may be to tune a receiver to a given station 813. It may be to program the microwave oven to a given cook time and power 815, to play songs in a particular order from the CD player 817, or it may be to receive a certain amount of money or gas from an product dispenser 819. These examples are given to illustrate a common and very wide based microprocessor-based appliance and appliance-operator interaction. In all of these different cases, the operator programs the appliance and then must wait for the intended result. In the case of the receiver, during power-on and station selection there is a wait time. In the case of a microwave oven cooking food, for example popcorn, the user waits for 2 to 4 minutes. During the process of powering-on a CD or DVD player and selecting the desired song or movie, the operator must wait. Certainly once an ATM user selects a certain amount of money to be dispensed, the user will wait for the money to be dispensed. Therefore, a need exists to provide the appliance operator, during idle time, additional information to inform, to entertain, or to educate the appliance operator.

Shown in FIG. 9 are the principal components of a communication enterprise 900 such as a network, the Internet, the World-Wide-Web or equivalent. PCS have enabled the compression and storage of huge quantities of data that are "tagged" and search-able. Communication companies have enable high-speed inexpensive communication of this data, from anywhere to anyone, at any time. One needs only to request selected information, and the network will deliver it. However, many times the speed of sending the answer back to the user is slow. As the images and graphics grow more data intensive, the transmission, decompression, and display takes longer.

FIG. 9 is a high level description of a LAN, (local area network) an Intranet, Internet, Extranet, a WAN (Wide Area Network), and, in fact, any plurality of microprocessor based communication devices. It will be noted that these connections may be wired, wireless, or any combination thereof. The common concept here is that there is a communication fabric 903 to communicate with microprocessor based devices, within which certain standards and protocols are defined and adhered to, so as to effect the communications required. This enables the microprocessor-based client 901 to request certain information by communicating through the fabric to the microprocessor-based server 905. Although the Internet and the World Wide Web are the best known examples of this, the fundamentals of these communication enterprises apply to networked devices.

FIG. 10 illustrates a flow diagram of an Internet or Intranet dial-up and Logon process 1000. At no time is waiting more important then at the start of an Internet dial-up. One must wait for the computer to make a connection to an Internet service provider (ISP), to verify the password and finally to "make the connection". This dial-up process can take 30 seconds to several minutes depending on many factors including modem speed, available network utilization and available bandwidth, and the server availability of a desired server. Therefore a need exists to provide the appliance operator, during idle time, additional information to inform, to entertain, or to educate the operator. The PC operator 1025 selects the icon to start the connection process and, if required, inputs the password 1003. Now the processor initiates the connection process 1005. This connection could be wired: a dial up modem, a cable modem, a wired local area network (LAN), or wireless: satellite, wireless modem, microwave, or any other type of wired or wireless connection. In any case, a "logical" connection is sought. At this point in time the operator 1025 is put into a wait mode 1021, while the processor and the network accomplish the task of connection. If the connection is not made 1009 the computer may re-dial several reprogrammed times 1007. Once the connection is completed the password and certain other information is sent, such as the connection speed. The service provider receives the password and checks for validity 1011. If the password is not valid the operator is asked to retry 1013. If the password is valid than a connection is granted 1015. Now, typically the operators pre-programmed home or first page of information is sent and rendered 1017. Only now has the operator completed waiting and there is something else, other than "connecting status", displayed on the screen 1023. At this point in time the operator has a normal Internet or Intranet session 1019. The connecting status allows the PC operator to be aware of the progress and status of the connecting process. The major steps are: dialing, connecting, verifying the password, making a network connection and finally connecting and the end of the wait for the operator.

There are application software solutions such as Point Cast™ and BackWeb™ that will display information that has been aggregated. The PC offers a list or menu to the user for down loading and viewing during their Internet session. Taken together, Point Cast™ and Back Web™ offer what is know as push technology. The user subscribes to certain information, and then receives this information during time periods when the PC is connected to a host. The downloaded information is selected from a list of information and news. It is important to understand that the user has the final say in what is displayed from a list of preferences. In addition, there is no user location or user time of day tuning for this information. Within the Internet there are E-mail products that are offered to Internet operators at no charge. These products are allowed to send, receive and compose E-mail when connected to the Internet from anyone's computer. In addition, a user's mail is stored in a server that is provided by the this E-mail company. The way that the E-mail provider can pay for this E-mail service is for advertisers to pay for ad space which is viewed during the users E-mail session. Examples of these E-mail products are HotMail™ from Microsoft and Yahoo Mail from Yahoo!™.

In all of these illustrative examples, the operator (or user) of a processor is waiting for the completion of a process. Waiting is a relative measurement of time. For example, the wait for a connection to the Internet the first time may seem short. But after daily usage this time seems very long. The time is the same, the perception and familiarity of the waiting is the real issue. Yet another issue is the aggregated waiting time between operators and processors. Considering only the Internet for example, there are about 50 million users in the U.S. on the Internet daily, who wait about 30 seconds each and every time. This waiting results in 47 years of aggregated waiting, each and every day. Accordingly a need exists to overcome the problems noted above by providing a user of a dial-up networking service additional information to educate, to entertain, and to amuse a user while waiting for the dial-up connection to complete.

Yet, still another problem is the need to target messages to individuals. Advertisers, as one provider of messages, often want to specifically target their advertisement. User information such as zip code, age and gender, sometimes referred to "ZAG" has been one method in which to target messages. Although this method is useful, it does not provide as much information that sponsors of messages and advertisers want for targeting their messages. On the other hand, users of information are hesitant to provide their information to third parties for privacy reasons. Accordingly, a need exists for a method to provide information for sorting messages without compromising the privacy of the user.

The use of a microprocessor, controller, or information processing system is used to save time, labor, money, or to improve the quality of the product or service. The use of microprocessor-based systems has presented the user with a problem. The user is waiting for the end of the process that was initiated by the user to complete. User perception is important during times of waiting. For example; when elevators were first introduced, the time and effort of climbing the stairs of high rise buildings were replaced by the comfort and time ridesaved by riding up or down in an elevator. However once in place the elevator users (operators) had complaints about the speed of the service. The users must wait for the elevator to arrive at the floor of the user. The elevator solution had a problem. The owners of the elevators wanted to solve the perception of the long wait for the elevator ride. The solution was for the elevator owners to install mirrors around the doors. The perception was that the speed of service of the elevators had improved. In reality, the wait time for the elevator was the same. What had changed was that the elevator user (operator) was using the mirror to look at themselves, or at others, during the wait for the elevator. Therefore, a need exists to modify a user's perception of waiting for a user initiated task to complete by presenting additional information.

SUMMARY OF THE INVENTION

Briefly, in accordance with the present invention, disclosed is a method and apparatus that addresses the wait-time between an operator and a processing machine by providing the user with information during waiting periods. The operator determines that there is a need for a process, the operator starts the process and then during the processing the operator is waiting. This wait time or latency are such times as: while the operator is waiting for a processing device such as a personal computer (PC) or wireless entertainment device; while the processor is waiting for an operation to be completed (such as dialing on to a network); while the processor is waiting for a new command from the operator. The operator may need to check if the process is complete, and when the process is complete the operator determines if the need was fulfilled. These wait-times will be used for rendering information and interacting with the information. This information, which may be multimedia, contains educational and or entertainment information, in addition to the status of the process the operator is waiting to complete.

BRIEF DESCRIPTION OF THE DRAWINGS

FIG. 4 is an illustration of a PC start screen message for Windows 95 during the cold start-up process in the flow diagram of FIG. 3.

Figure 5:
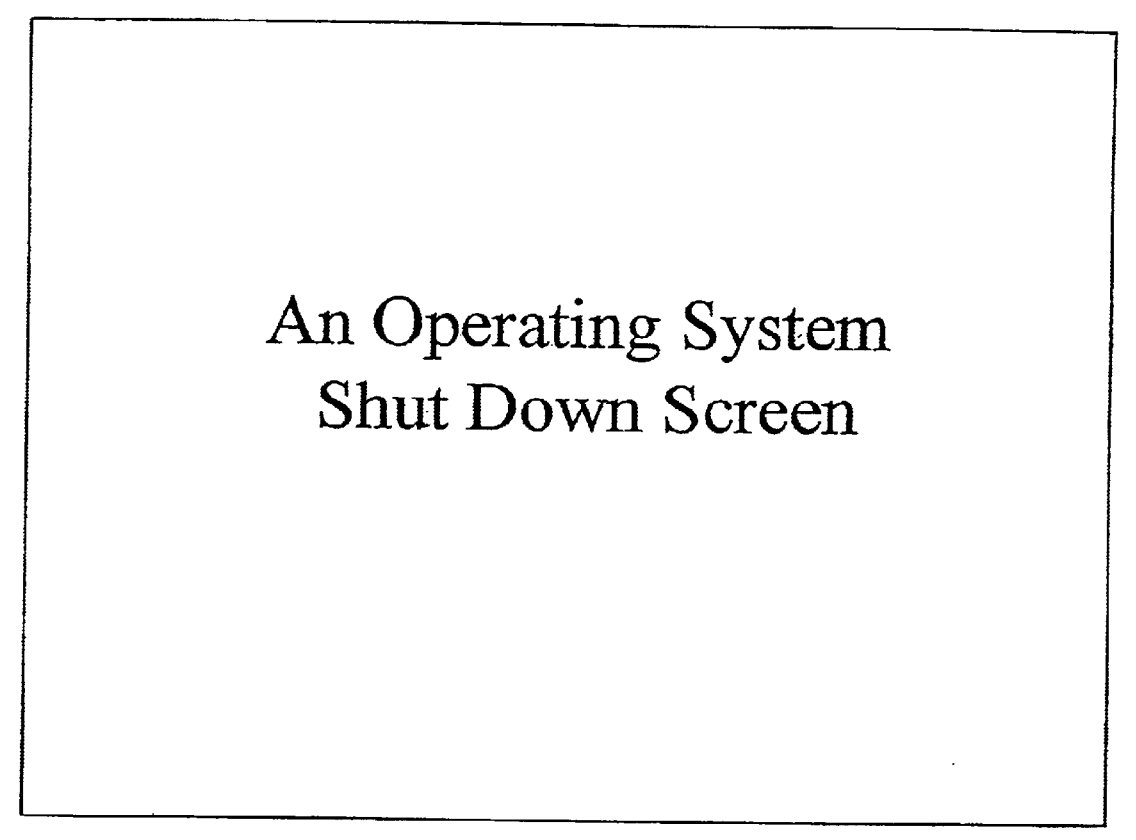

FIG. 5 is an illustration of a PC shutdown screen message for Windows 95.

FIG. 19 is an example illustration of a full page message for flow diagram in FIG. 16 according to the present invention.

FIG. 26 is a table of the different entries of FIG. 25 according to the present invention.

FIG. 28 is the resulting message table after filtering against the table in FIG. 27, according to the present invention.

FIG. 29 is a table of the message log for reporting the messages rendered from FIG. 28 on the client communications device 901, according to the present invention.

DETAILED DESCRIPTION OF AN EMBODIMENT

The term "informational message" is used throughout this specification. The term refers to a message that is not necessarily related to the processing being done, but is of general interest. An informational message can be any multimedia message. Messages include advertisement, amusements (such as a joke of the day), or educational messages.

A microprocessor has available to it information that can be a diversion to "speed up" the user's wait for the completion of a user-initiated process. These microprocessors can be used to perform concurrent or co-terminous processes. Once this is understood, it is also to be understood that the information that will be presented during the wait can be tuned to the specifics of the user.

Figure 1:
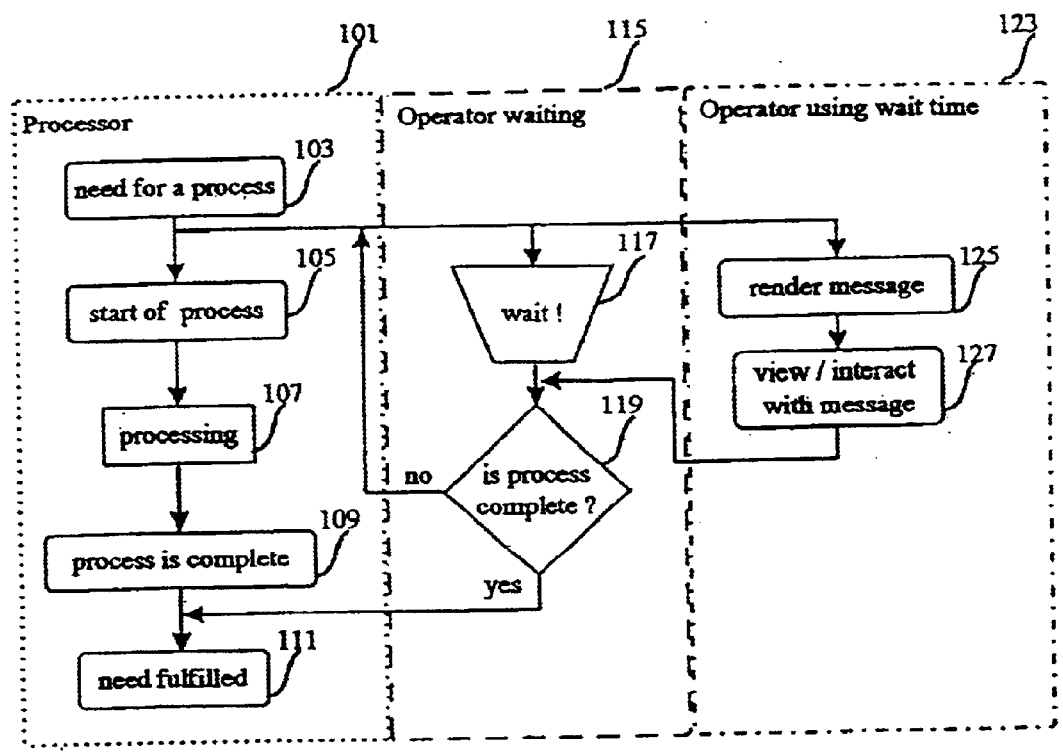
FIG. 1 is a block diagram illustrating an over view of a processing event illustrating operator-machine latency according to the present invention.
Figure 2:
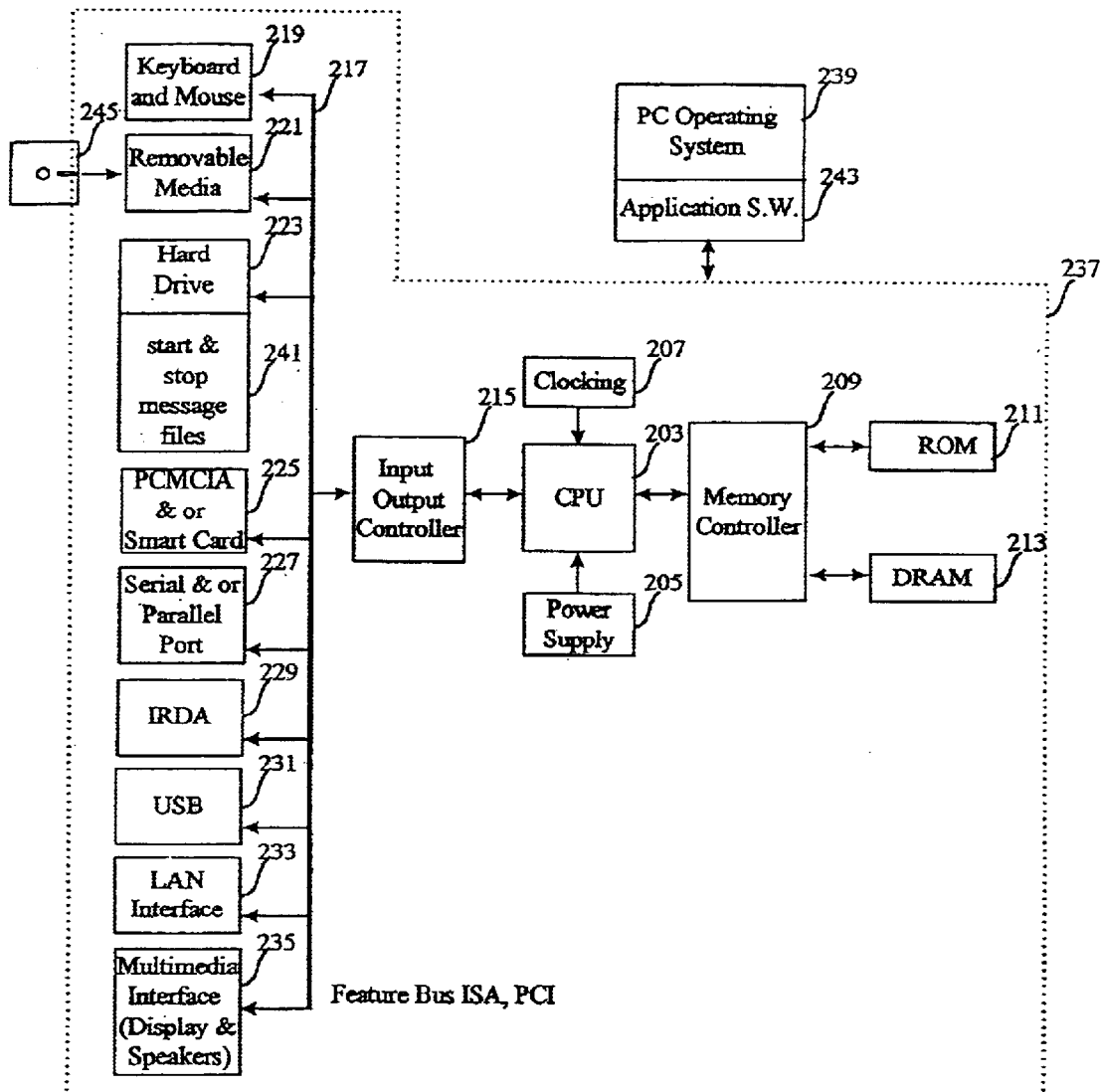
FIG. 2 is a block diagram of the principal components of a PC.
Figure 3:
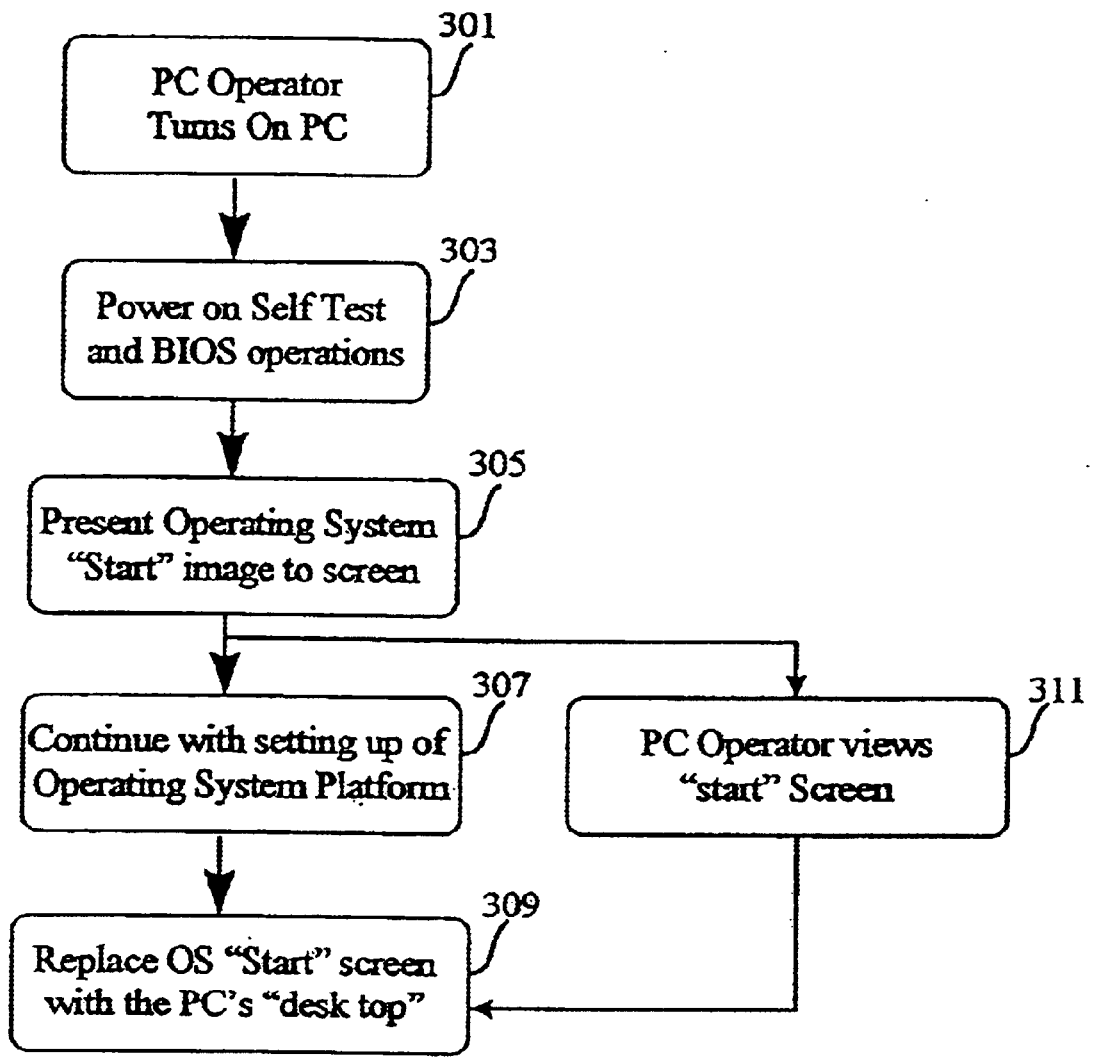
FIG. 3 is a flow diagram of the PC of FIG. 2 during a cold start-up.
Figure 6:
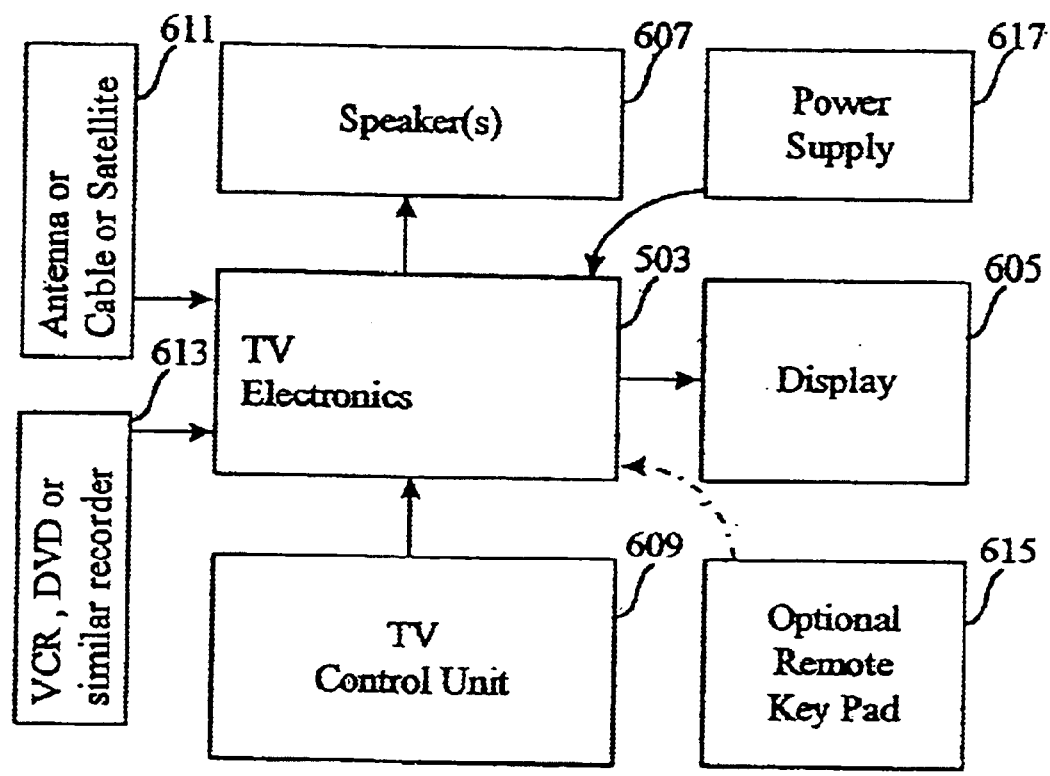
FIG. 6 is a block diagram of the principal components of a T.V.
Figure 7:
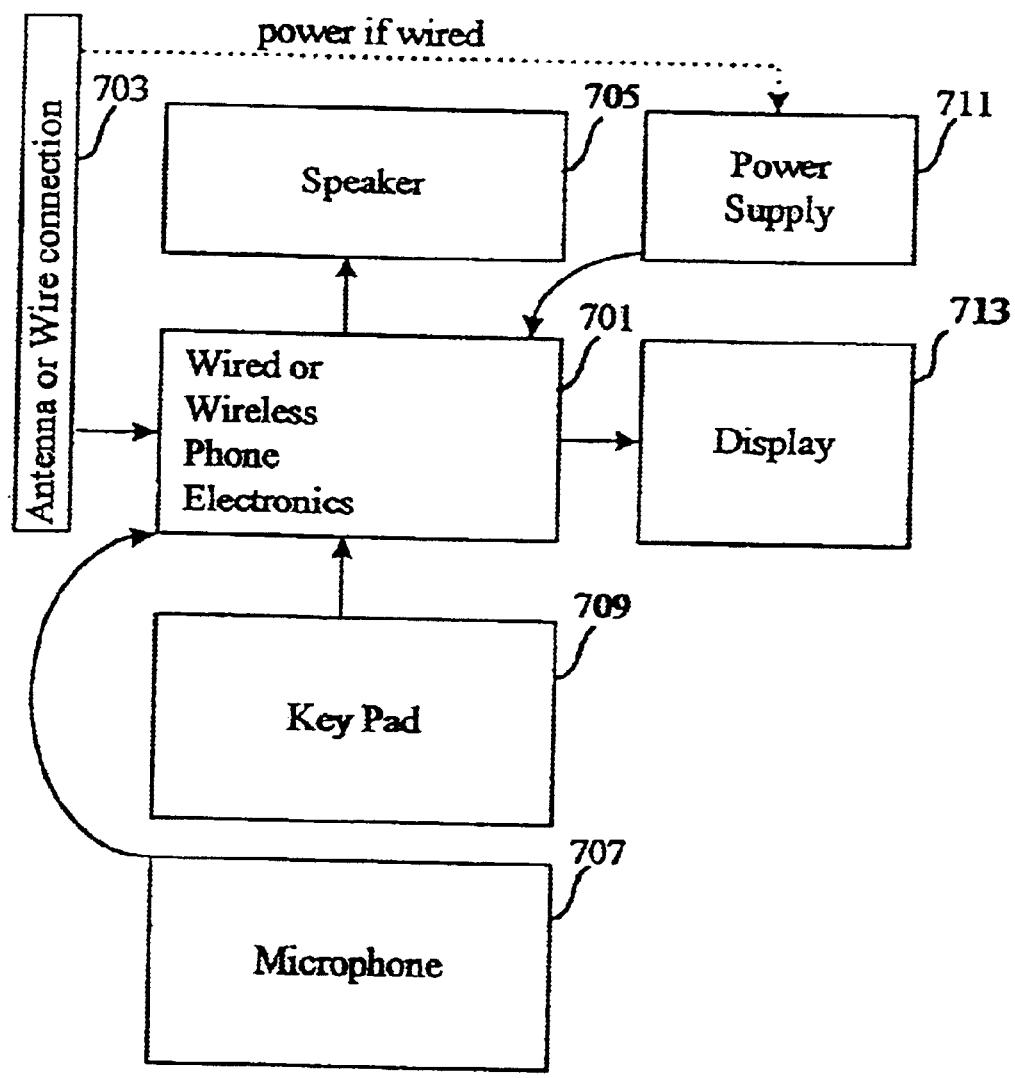
FIG. 7 is a block diagram of the principal components of a phone.
Figure 8:
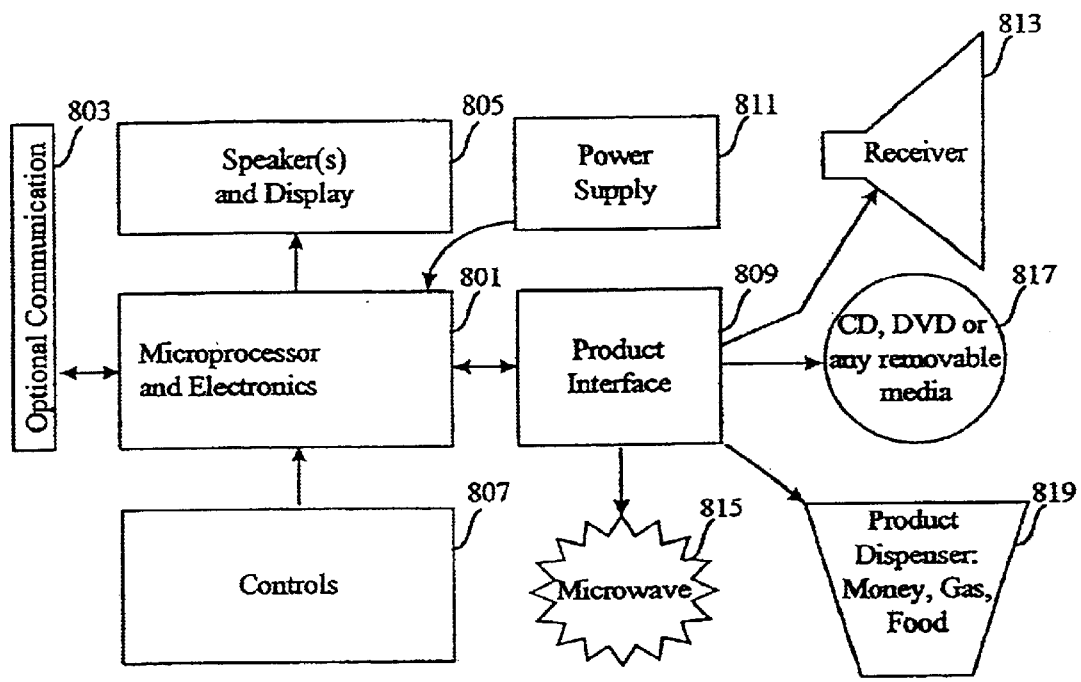
FIG. 8 is a block diagram of a microprocessor-based appliance.
Figure 9:
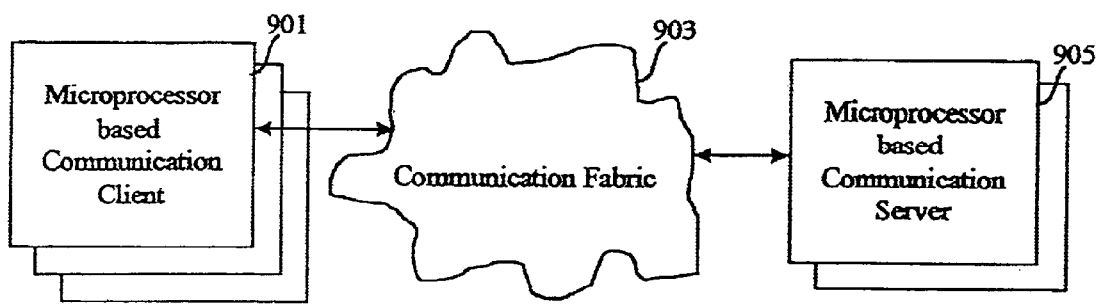
FIG. 9 is a block diagram of the principal components of a communication system according to the present invention.
Figure 10:
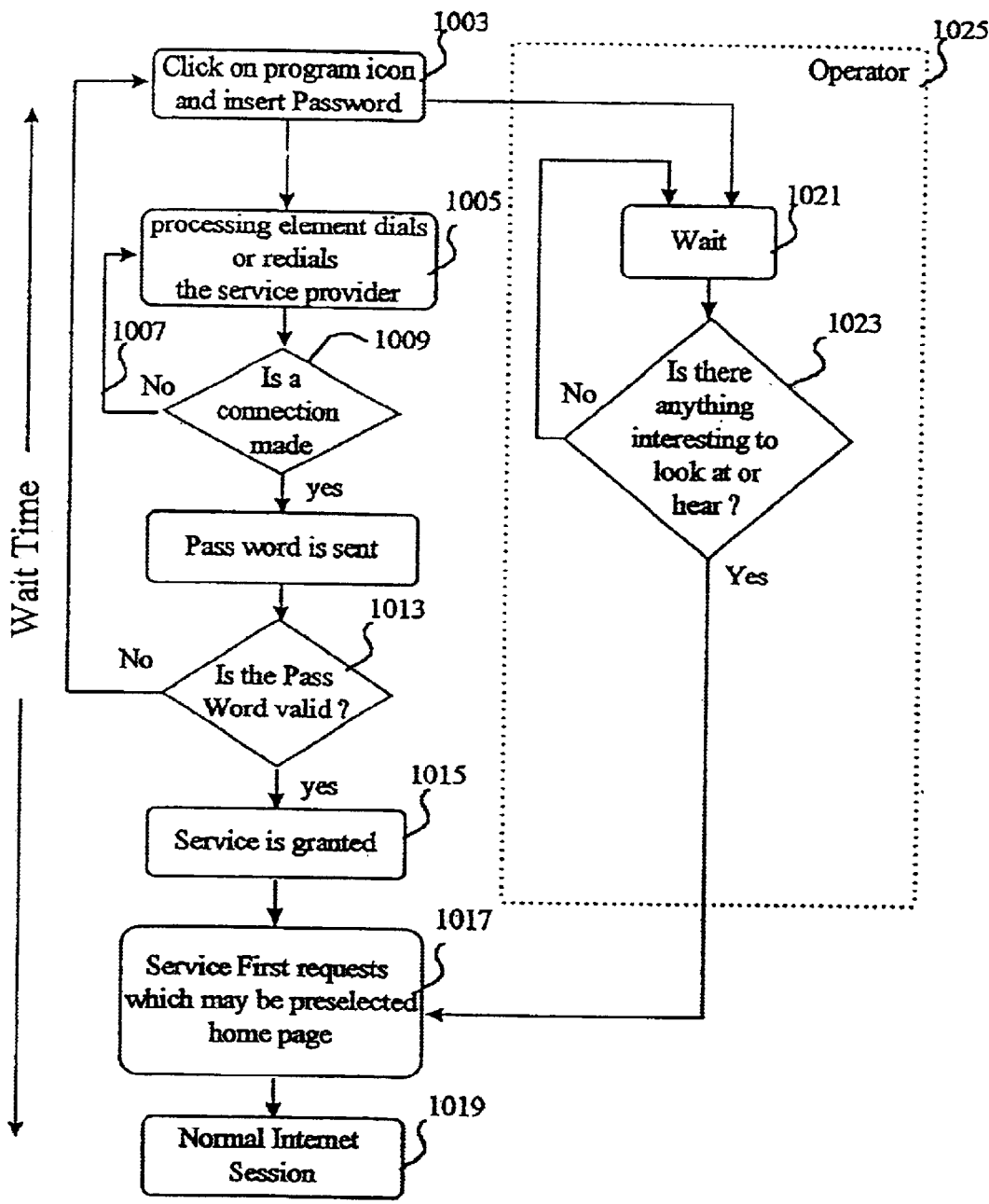
FIG. 10 is a flow diagram of a Internet or Intranet dial-up/Logon connection according to the present invention.
Figure 11:
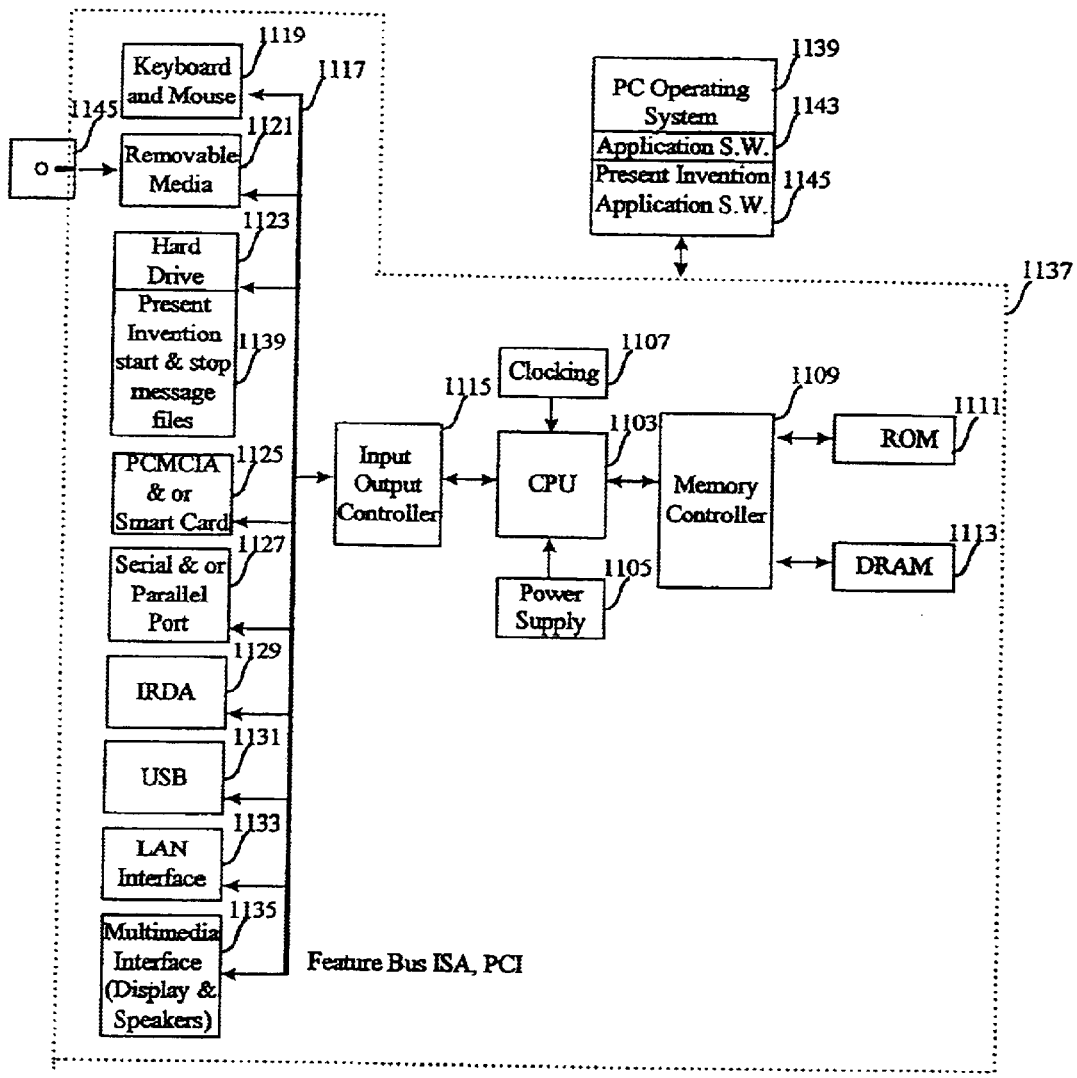
FIG. 11 is a block diagram a PC of FIG. 1 with the application program according to the present invention.

FIG. 11 illustrates a block diagram of the principal components of a personal computer (PC) 1100 in accordance with one embodiment of the invention. The PC's processing is done by a central processing unit (CPU) 1103. The CPU receives its electrical power from the power supply 1105 and its performance is determined by the speed of a clock 1107. The CPU must control the data and process it when it is received from an input and output controller 1115 and a memory controller 1109. The memory controller interfaces between a dynamic random access memory (DRAM) 1113 and a read only memory (ROM) 1111. The input/output controller interfaces with a feature bus 1117. On the feature bus 1117 there may be any type of optional non-volatile data storage, optional communication device, or optional processing control devices. The non-volatile types of storage are non-removable, such as a Hard Disk Drive 1123, or removable, such as a PCMCIA card or a smart card port 1125 (credit card size cards), removable media which accepts such media as floppy disks, CD's (compact disks), Zip™ disks, or, in fact, any type or kind of removable media 1121. Optional high speed communication with the PC 1100 is accomplished using wired ports such as a serial or parallel port 1127, a universal serial bus (USB) 1131, or a local area network (LAN) connection 1133. Optional wireless communication with the PC 1100 is accomplished by such ports as an infra-red data attached (IRDA) port 1129. The operator receives real time processing results from a multi-media Interface 1135, which are the combinations of the PC display and the speaker(s). The operator controls the PC by a keyboard and mouse 1119. This entire system known as a Hardware Platform 1137 must work in cooperation with a PC operating system 1139. Operating systems include Microsoft Windows NT, Apple System 7, IBM OS 2, or the equivalent thereof. Application software is any program designed to run on a PC operating system 1143.

Note that the application software stores on the Hard Disk Drive 1125 certain files or messages 1139, such as the operating system 1139 start and stop screens. The present invention resides as one of the application software solutions 1145.

Figure 4:
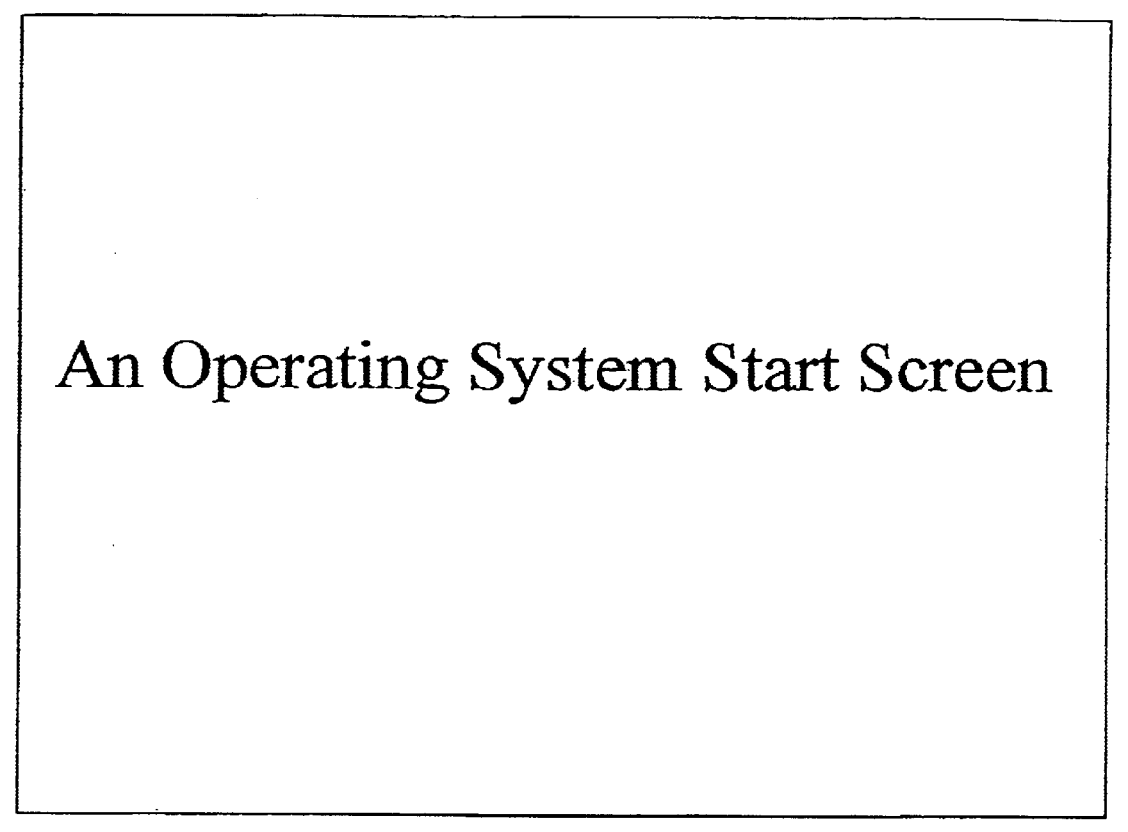
Figure 12:
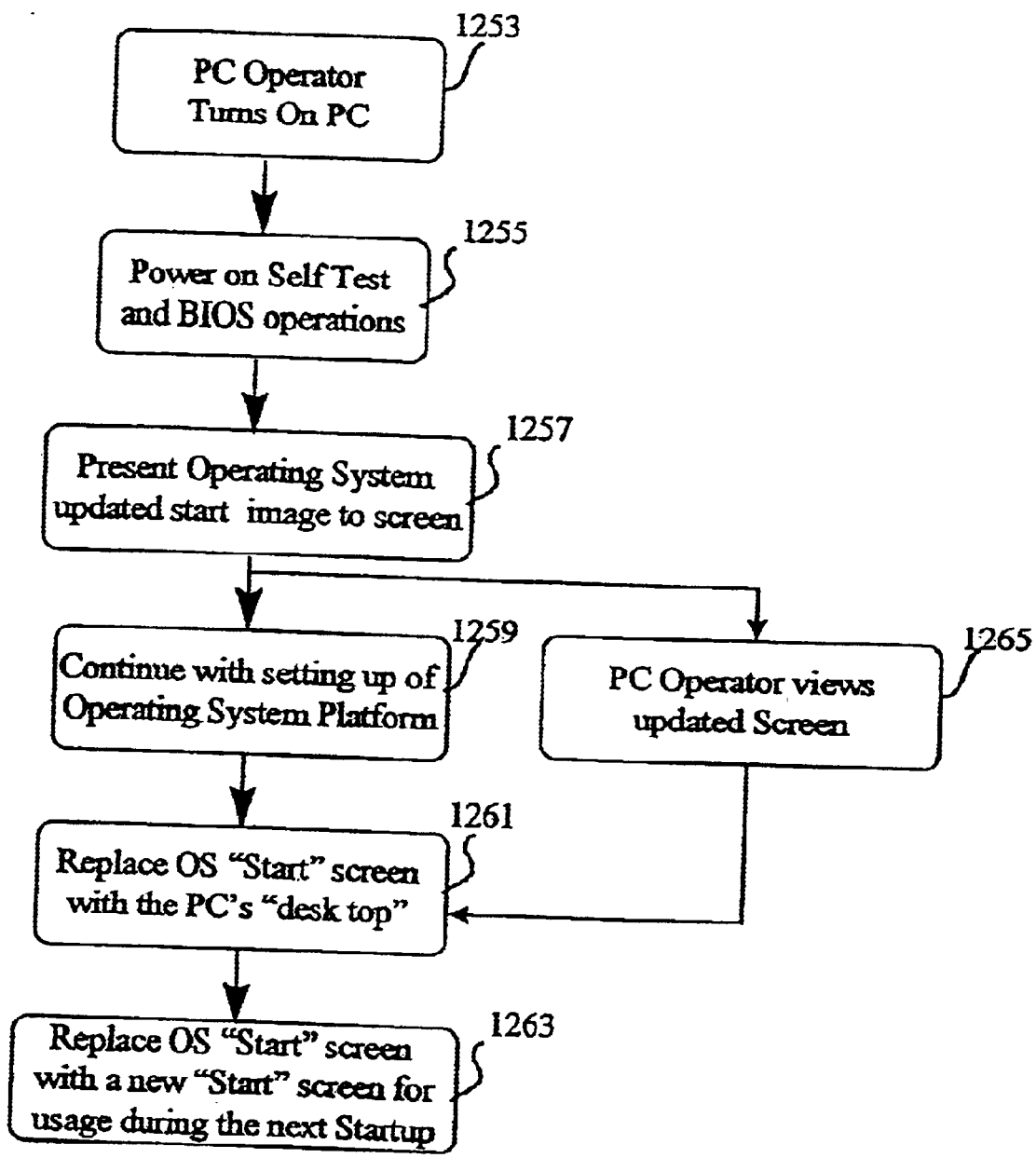
FIG. 12 is a flow diagram of an operating system with a start screen of the PC in FIG. 11 according to the present invention.

FIG. 12 is the flow diagram of the present invention with the PC operating system 1139 running on a PC hardware platform 1137 as described in FIG. 11. The PC is turned on by the PC operator 1253. The PC accomplishes the power on self-test and BIOS operations 1255 which is known to those skilled in the art. The operating system 1239 renders the "Start Screen" to the monitor, such as the Windows 95 banner 1239 as illustrated in FIG. 4, which has been stored during the previous power cycle 1257. The operating system 1239 continues to set up the operating system platform 1259. During this time the operator views the "new" start screen 1265. The viewing is complete after the start screen is replaced with the desk top 1261. Once the operating system is set up the PC operator uses the PC in the usual way. The Hard Disk Drive 1123, at a certain address, has the operating system start and shutdown screen images 1139 of FIG. 11.

These images are replaced by the present invention software during the previous PC session. The images are sought by the present invention software from any previously agreed to source. For example, during an Internet session the ISP 905 provides new images which are written to the certain locations in the PC's Hard Disk Drive 1139 of FIG. 11, which will be presented during the next PC power cycle. The replacement of certain files by the ISP during an Internet session is called updating. The method and means for accomplishing this is understood by those skilled in the art. This allows for the operating system's start and shutdown screens to be new, updated or fresh, and of interest to the PC operator. Using the present invention, the PC system 1100 can store into the location of this screens image a updated image. Therefore, each time the user turns on or off the machine a new image is presented. The intent and usage of these screens may be educational, or for commerce, such as advertisements, or in fact, for simple amusements such as a joke of the day.

A similar method described for the PC 1100 start screen 1265 can be used for the PC operating system shutdown screen. Moreover, certain standard screens, such as the PC desk top screen, in fact, any and all "standard" screens that are presented to the PC operator during times of waiting can be replaced, kept updated and current. All standard wait screens or dialog boxes can benefit from the present invention. For example, several application software programs present a "tip of the day" dialog box, e.g. Window 95, Microsoft Word, Lotus WordPro, just to name a few. This "tip of the day" dialog box can be replaced by newly down loaded messages. During the printing of very large graphic files the printing dialog boxes can be replaced by a screen that contains messages that may be related to printer products and related interests. Screen saver screens which are activated by the operating system after a time of inactivity by the PC operator, can be updated and therefore of use to the PC operator during the waiting and be tailored for the time of the day, week, season that the screen saver is being rendered. A more detailed explanation of filtering is discussed in FIG. 21 below.

Figure 13:
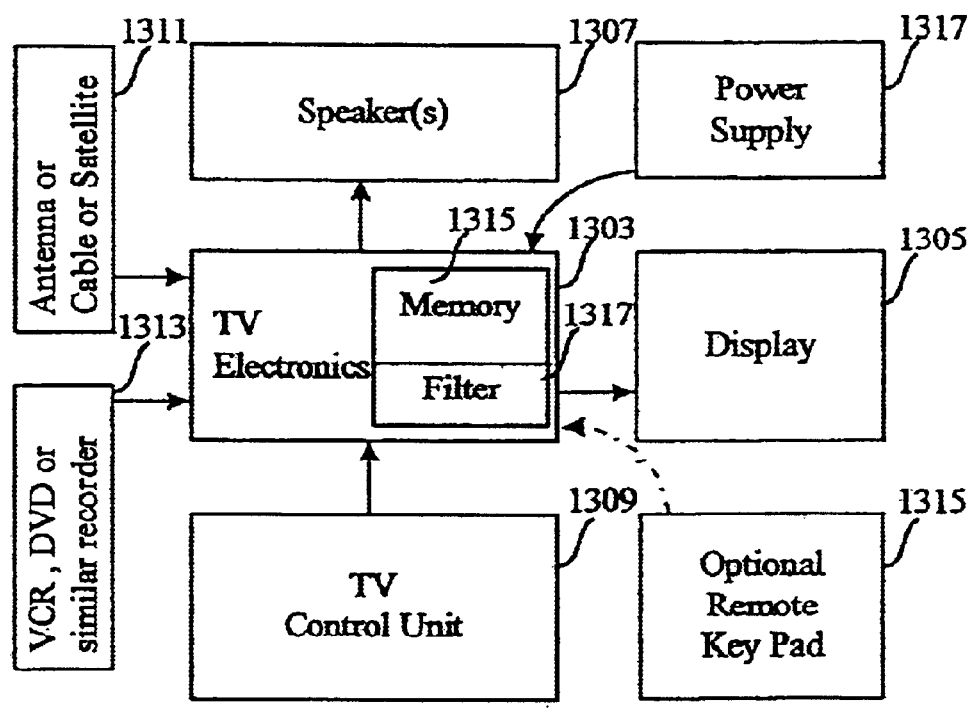
FIG. 13 is a block diagram of the principal components of a T.V. according to the present invention.

FIG. 13 illustrates the principal components of a TV 1300 according to the present invention. The operation of a TV is well understood. The TV electronics 1303 is almost a completely analog mixed signal, and, in the future, will be converted totally to digital with the up coming High Definition Television (HDTV). The TV has an electrical power supply 1317. The TV has a video display 1305. The TV provides for audio with one or more speakers 1307. The TV has a TV control unit 1309, which is the TV channel selector, volume, and other user settings. The TV must receive a signal, which may real time (live) broadcast from an antenna, cable, or satellite 1311. Alternatively, the TV may have a pre-recorded input from a VCR or Digital Video Disk (DVD) 1313 input. Finally, the TV may have an optional remote control 1315. The memory 1315 and a apparatus for choosing which TV image to display upon being turned on is connected to TV electronics 1303. The amount of memory can be small in the order of (640×480×3 Bytes) 921,600 bytes. This is simply illustrated here as a filter for messages 1317. Using known methods, one skilled in the art can combined the proper attributes the images that were stored in the memory 1315 allow the filter 1317 to select a particular TV start screen based on certain methods and techniques that will maximize the revenue for the provider of the information. These methods are but not limited to: the time of day the TV is turned on, the location of the TV, the currently selected TV channel in which the image can be tailored to market demographics associated with the channel. Further detail on the filtering methods are described in FIG. 21 below.

During the normal viewing of TV certain multimedia messages were stored in the memory 1315 for usage by the filter during the next power cycle. The content of the message may be a static screen, a video, or only an audio clip. These messages may be sent using VBI (Vertical Blanking Interval), Intercast (a product from Intel that requires a PC in addition to a TV), DVB-2 (Digital Video Broadcast -2), or any equivalent technology. It is also understood that these messages may be sent using "other" technologies, such as the telephone based Internet, FM radio, or, in fact, the messages may be sent in bulk on a DVD player to be accessed using the filtering methods discussed in FIG. 21.

Now when this TV is turned on the TV operator will experience a first message. The duration of this first message, even if it is short, such as a few seconds, will allow the TV user to view the message that will be of interest, based on the users location, time of day, and viewing habits.

Figure 14:
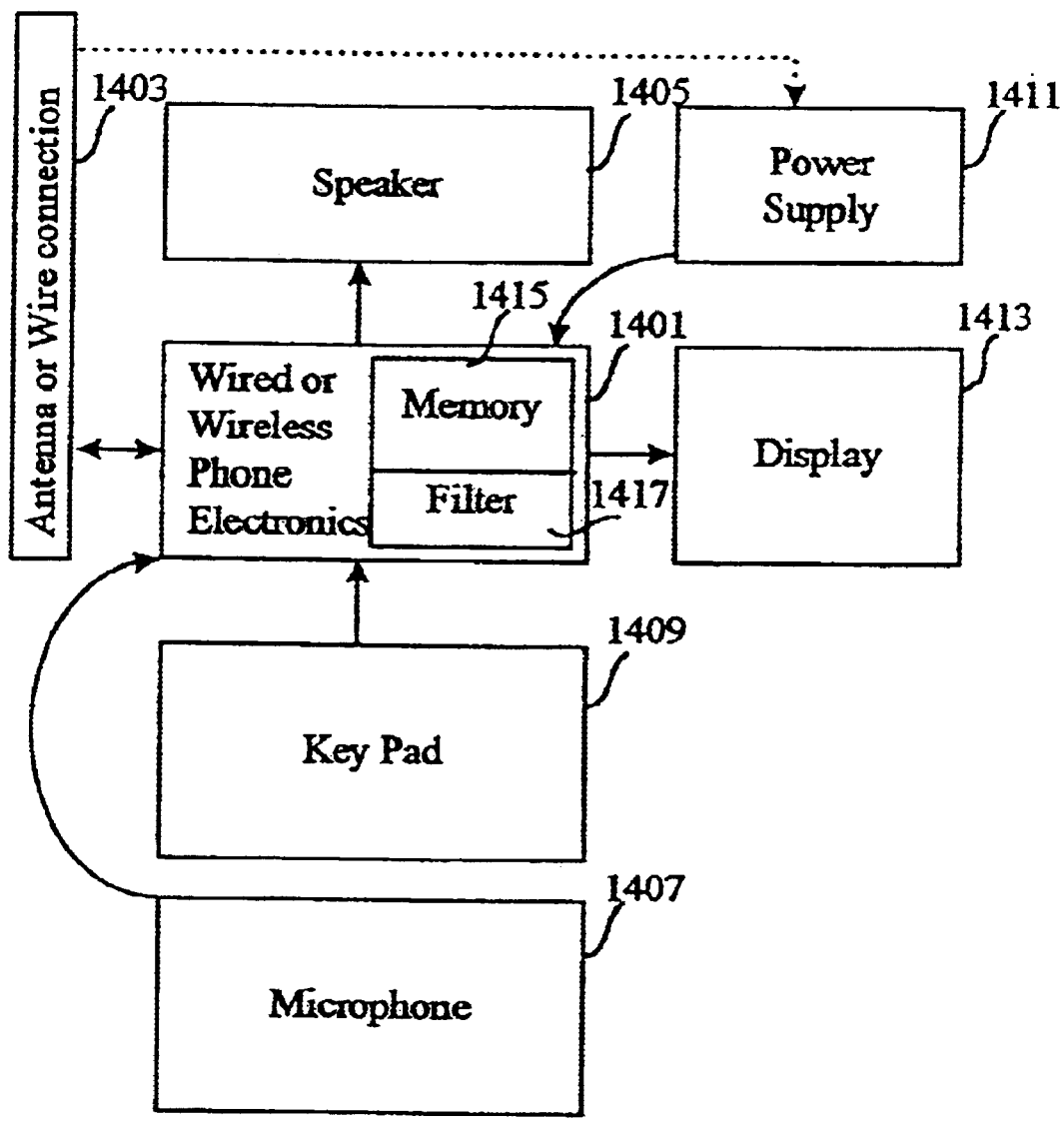
FIG. 14 is a block diagram of a phone according to the present invention.

FIG. 14 illustrates the principal components of a phone according to the present invention 1400. The telephone electronics 1401 sends and receives information from the antenna or wire connection 1403 and gathers the two phone users voices to be transmitted over the phone's electronics 1401. This information is decoded (analog or digital) and presented to the speaker 1405 and microphone 1407. The key pad 1409 is used to "dial", and for interfacing through the phone. The power is supplied from the wired connection or, for the wireless phone, the power is from the battery 1411, and a display 1413 for visual presentation of information. The memory block 1115 and the filter block 1417 is electrically coupled to electronics 1401. This phone can now render, display or announce with audio, information that has been selected for this geographic location. The location can be as general as the area that is covered by a cell tower, or as specific as a caller ID. The message is based on the time of year, day of week, and time of day. In an alternate embodiment, the message is keyed to the user's pre-selected interest. The message is sent to the phone and stored in the memory block 1415, for usage immediately or in the future, based on the filter block 1417. Therefore, during the waiting for connection or after the call has been completed, the present invention provides for rendering information that will inform, entertain and educate. The information is sent and stored in the phone during the times of user inactivity. These times are: during the ringing for the called phone to pick up, during the pausing and silence during the normal conversation, and in fact, can even be encoded and coupled on to the voice signal during the spoken conversation. The information can be presented on display 1413 as a visual message or mixed into speaker 1405 as an audio message or a combination of both.

Figure 15:
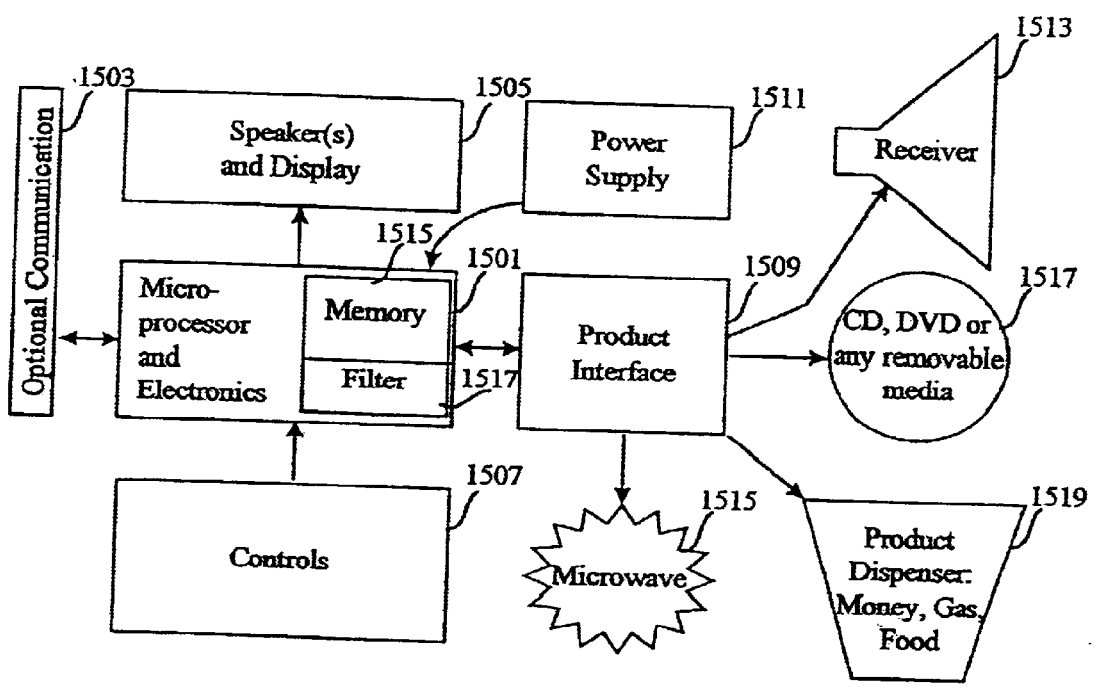
FIG. 15 is a block diagram of a microprocessor-based appliance according to the present invention.

Shown in FIG. 15 is the major components of a microprocessor-based appliance according to the present invention 1500. The microprocessor and electronics 1501 receive commands from the appliance operator through the Controls 1507. The microprocessor and electronics 1501 also sends, and or, receives information from optional communications 1503. In the case of a receiver, this is simply the station that the receiver is tuned to. In the case of the product dispenser, the communication is for PIN and money card authorization. The CD, DVD player and microwave may not have any communication. However, note that it is common for a CD player to be part of a radio. This entire unit is powered by the Power Supply 1511. During the request for service from the microprocessor, the operator interacts with the appliance using the Speaker and Display 1505. Once the appliance is programmed, the microprocessor and electronics interacts with the Product Interface 1509. This may be to tune a receiver to a given station 1513, it may be to program the microwave to a given cook time and power 1515, it may be to control the turn table to play songs in a particular order from the CD player 1517, or it may be to receive a certain amount of money or gas from an product dispenser 1519. With the addition of the memory block 1515 and the filter block 1517 the microprocessor base appliance can now render (display or announce with audio) information that has been selected for this location, time of day, and user's preference.

The present invention will be applied to today's appliances so as to render information that will inform, entertain and educate during the waiting times. An example of this is while turning on a receiver, a brief audio message is given. Or when micro-waving popcorn a message is rendered which may be an audio message or a displayed image. Audio or video player can render messages during startup and user selection. During the wait for money an ATM (Automated Teller Machine) a tuned message may be rendered. The users are known by having a personal sign-on or icon that would separate different members of a family. In the future, even voice will be use for personal identification. The additional tuning will be accomplished by attention to the appliance's location and the time of day. For example, return to the microwave or audio and video player. Technology exists for networking devices in a family home. These typical networks are unidirectional, such as X-10, or bi-directional, such as Ethernet. The user's home is interfaced to the Internet. Each user's appliance has a unique ID or address or URL (Uniform Resource Locator). Appliance networking over wired or wireless technologies is known.

Figure 16:
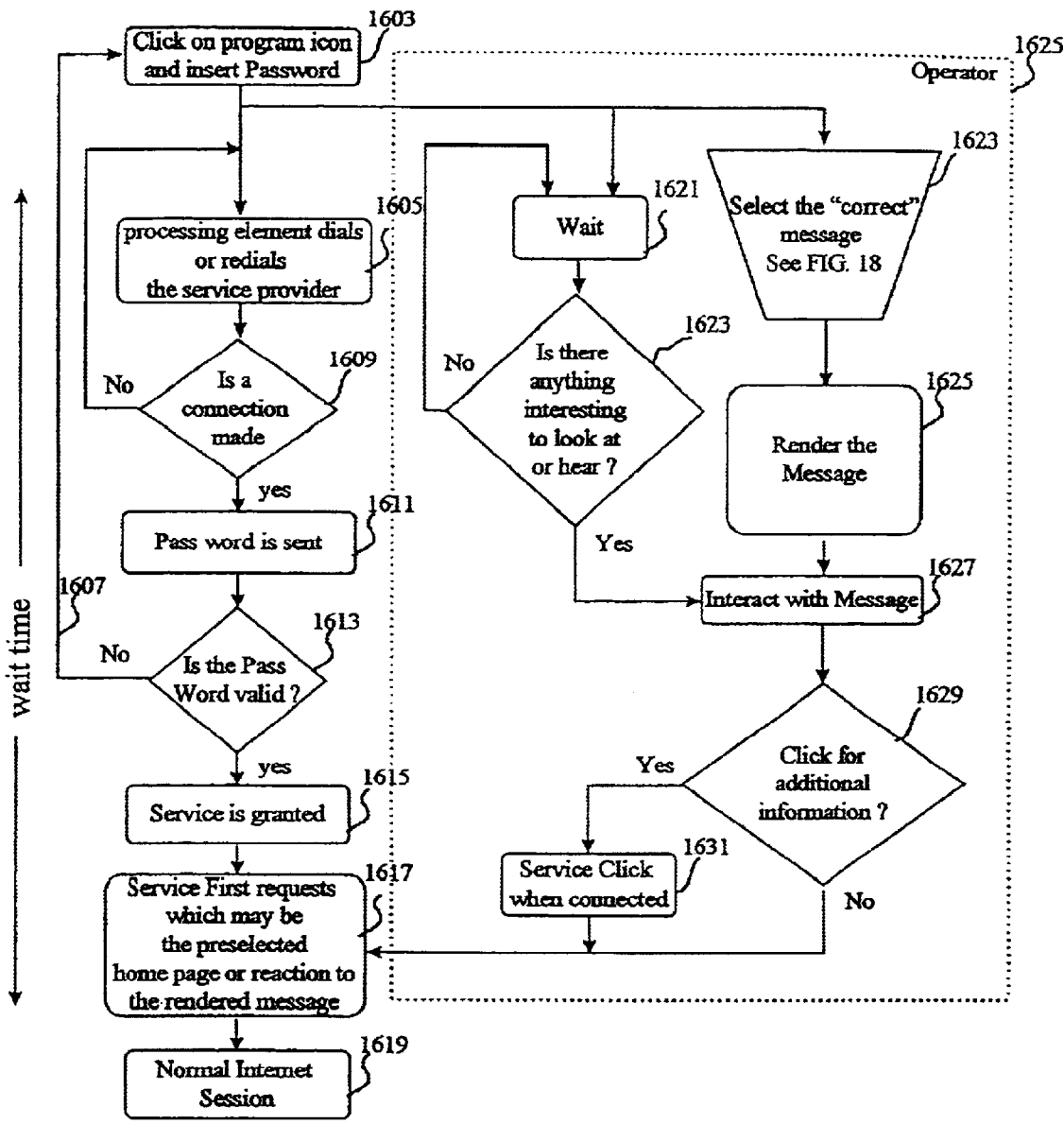
FIG. 16 is a flow diagram Internet connection according to the present invention.

FIG. 16 illustrates a flow diagram of the present invention with a Internet or Intranet connection 1600. As with the prior art, the PC operator selects the icon to start the connection process, and, if required, inputs the password 1603. Now the microprocessor initiates the connection process 1605 to a server such as an ISP. This connection could be wired: a dial up modem, a cable modem, a wired local area network (LAN), or wireless: satellite, wireless modem, microwave, or any other type of wired or wireless connection. In any case a "logical" connection is sought. At this point in time the operator 1625 is put into a wait mode 1621, while the processor and the network accomplish the task of connection. With the present invention a correct message is selected and rendered 1823. The selection or filtering of the messages is described in FIGS. 17 and 18.

This message is rendered 1625. Now the operator has something additional to look at or hear 1623, and may interact with the rendered message 1627. The operator may click to request additional information 1629. If so, this request will be serviced upon connection to the ISP. In either case, the operator is connected to the Internet and either the home-page is rendered, or the operators request for more information 1617. If the connection is not made the computer may re-dial several reprogrammed times 1607. Once the connection is completed the password and certain other information is sent, such as the connection speed. The service provider receives the password and checks for validity 1611. If the password is not valid, the operator is asked to retry 1613. If the password is valid than a connection is granted 1615, and the users home page or message request are granted. At this point in time the operator has the usual Internet or Intranet session 1619.

Figure 17:
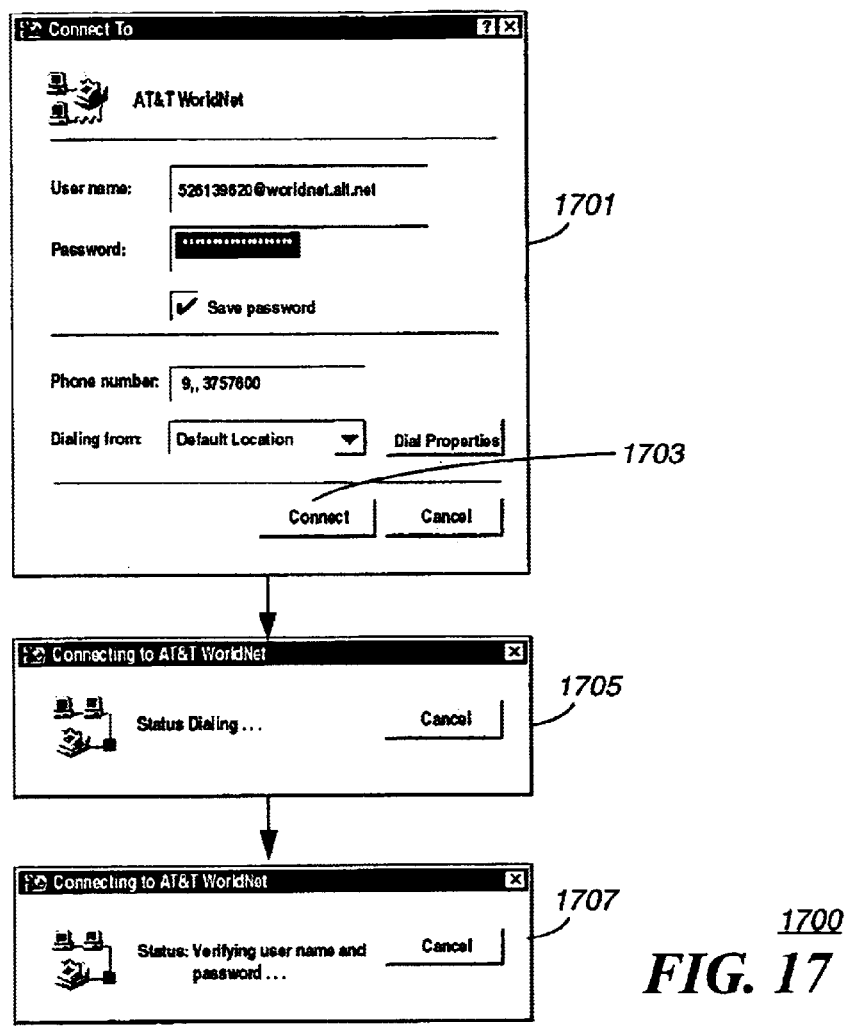
FIG. 17 is an illustration of an ISP's dialog box during Internet connection of FIG. 16 according to the present invention.

Turning now to FIG. 17 is an example of a state of the art ISP dialog box that is presented during the dial up process 1700. This is an example dialog box for step 1703 above. When the operator clicks to Logon to the Internet, a dialog box is presented 1701. As illustrated here, the operator's name, hidden password, phone number to be dialed and location are displayed. When the operator clicks on "connect" 1703, the dialer software calls the ISP 1705, steps 1705 and 1709. Once a phone connection is established the ISP verifies the user name and password 1707. If they are verified than a connection is granted steps 1711, 1713, and 1715. Note that these dialog boxes are not co-resident. The first one 1701 is replaced by 1704, and then by 1707, and finally, if a connection is granted, by the user's Internet Browser. It should be further understood that these dialog boxes are typically in the center of the screen and that the total normal connection process takes about 30 seconds.

Figure 18:
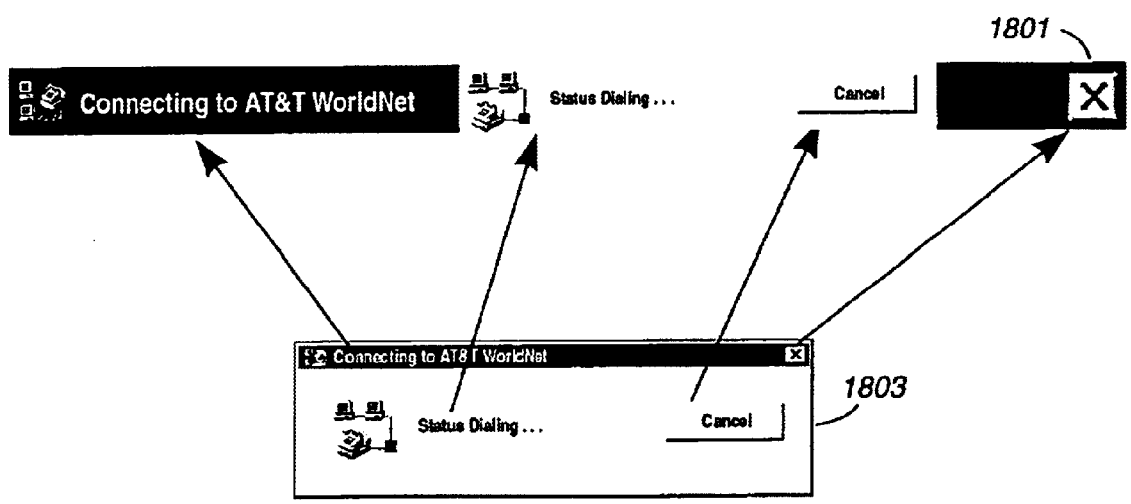
FIG. 18 is an illustration of the movement of the dialog information from FIG. 17 into a dialog strip according to the present invention

FIG. 18 illustrates the movement of the dialog information from the dialog box to a dialog strip 1800. The dialog boxes of a normal connection 1801 are replaced with a dialog strip 1803. Note that all of the dialog information is presented to the operator. This assures display of the information on the desired process while allowing for a very large message to be displayed. It should be understood by those skilled in the art, that the exact direction of movement of the dialog information to a dialog strip 1800 is not limited to being positioned along the top of the display. Any position on the screen is contemplated including the bottom, right side, left side, and the middle of the screen.

To those skilled in the art, the method of resizing the dialog boxes is known. The application program 1145 is written in any available programming language such as C/C++ or assembler. The application program 1145 repositions the status information and user interaction buttons such as "dial" and "cancel". It is also understood that the dialing operation is started and then the pre-cached message is displayed. The operating system is multi-tasking so that the two tasks are being operated on in parallel. The actual dialing is programmed using Microsoft's Window 95 sub-routine called RAS (Remote Access Service). All of this programming is a particular embodiment of the present invention. Deviations and improvements are considered to be in keeping with the true scope of the present invention.

FIG. 19 illustrates the rendering of a full page of informational messages 1903 with the status of the on-going process 1901. This information is from the U.S. Patent and Trade Mark Office job placement home page. The present invention allows for this full page of non-invasive messaging. The message is a full "page" of Internet authored content. Before connection it is simply HTML (HyperText Markup Language) data. Once connected the page is active, and one may "click" on active parts of the message for additional information. It is also understood that the "page" is scrollable and therefore may in fact be several pages long. Moreover, in an alternative embodiment, the informational message 1901 can pop-up to overlay the current dialog message with the informational message filtered as described in FIG. 20 below.

Figure 20:
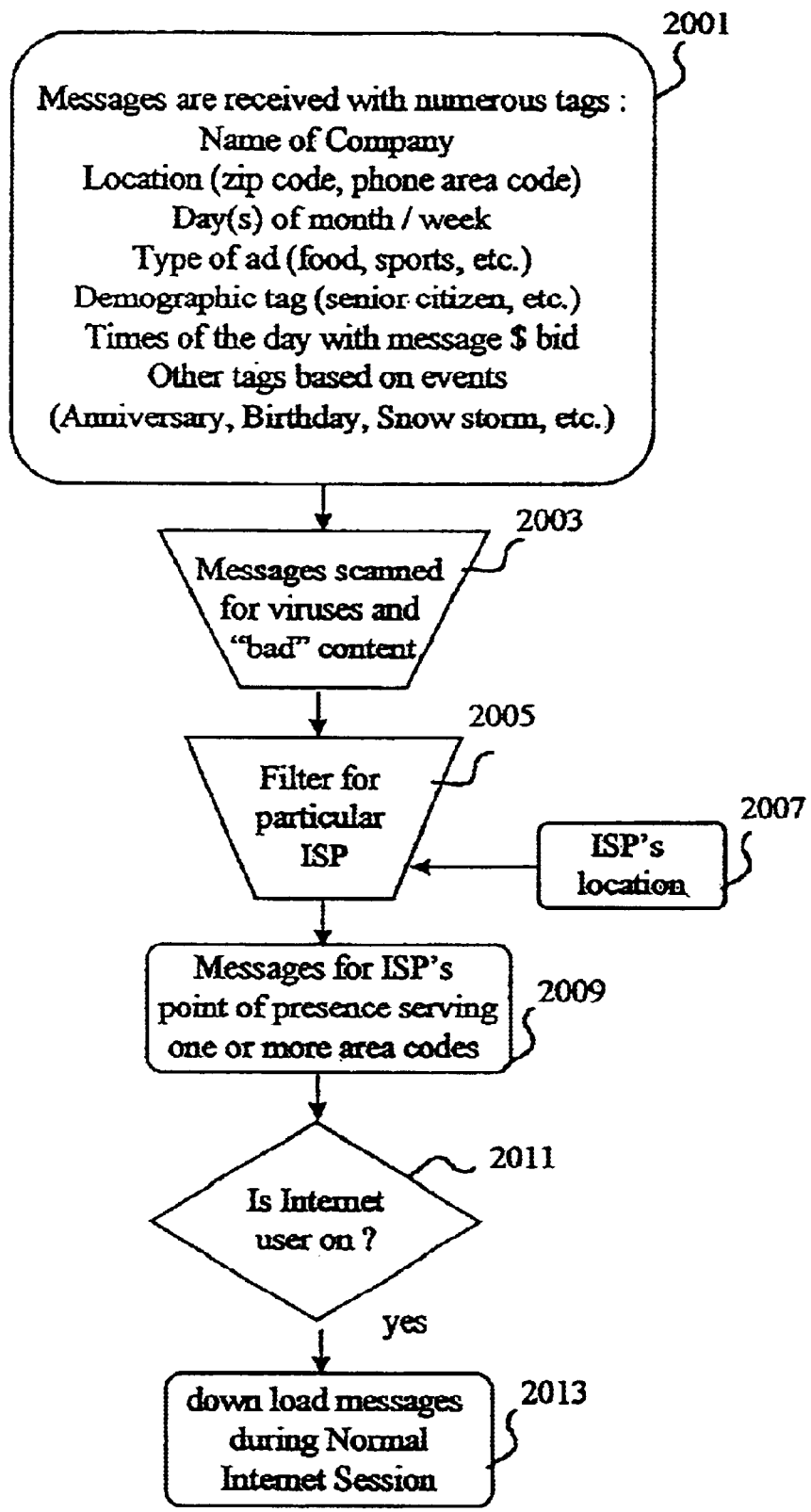
FIG. 20 is a flow diagram illustrating the filtering messages for a microprocessor-based system in FIG. 15 according to the present invention.

FIG. 20 illustrates a flow diagram of the present invention's method for filtering message delivery to the processor 2000. The messages that are rendered onto the screen and or through the speaker have been authored and tagged 2001. For the Internet the information is simply HTML files with certain tags. These help the delivery system to filter the messages so as to maximize the users interest. These tags are: name of company, location of targeted zip codes, locations of the targeted area codes, specific list of caller ID's, the dates that they shall be rendered, the type of the message, name of the particular user during this Internet session, demographic tag, the times of the day that the message shall be rendered and the amount of money the author will pay, and finally, any tags that are based on events. To those skilled in the art there are many methods or means for tuning or tailoring the delivery and rendering of the messages. One embodiment is described in FIG. 22 below.

When an author composes a message it is presented to a filtering process 2003 to stop all messages that are undesirable or "bad". Undesirable is defined as hate groups, smut, and the like, will not be accepted, in addition the messages are scanned for viruses. The resulting total list 2005 contains all messages with their associated tags. This list is then sorted for particular ISP locations 2007 and the resultant list is sent to particular locations 2009. The individual ISP's, then, have the list of messages that are available for their subscribers. When a PC makes a connection the present invention selects from the local list and down loads ones that match the particular PC's predefined interests. This match from a local ISP to a particular PC may extend all the way down to caller ID and a particular user's stated interests and important personal dates. It should be noted that at this time none of these messages are rendered, they are simply stored in the Internet cache location located in communication server 905. It is further noted that each time the user connects with the ISP only updated messages need be sent. This completes the delivery of the filtered messages to the non-volatile storage of a PC. The process flow of FIG. 20 is not limited to running on a PC, and can be run on any microprocessor-based system or appliance or data processing device as disclosed in the present invention.

Figure 21:
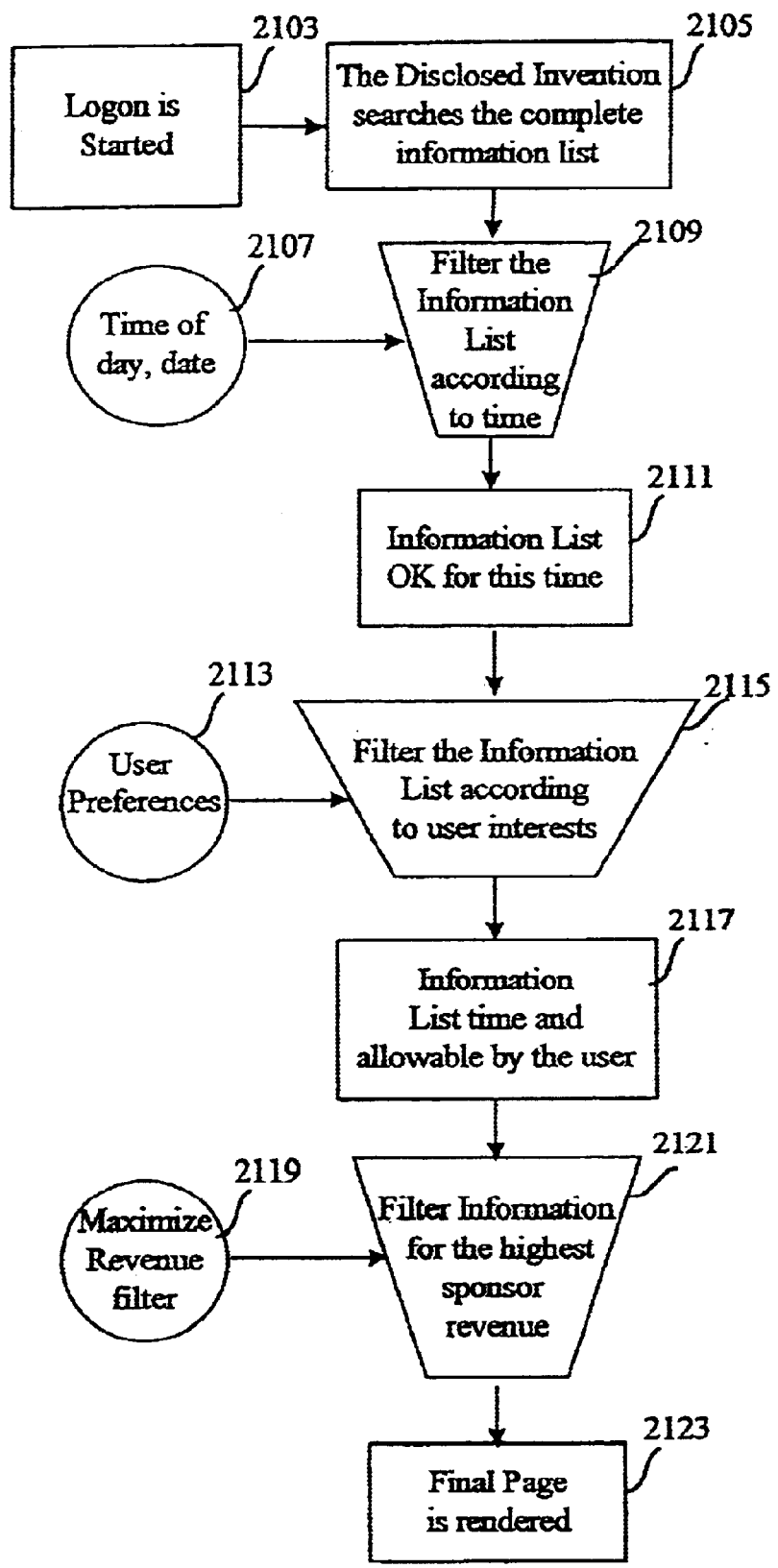
FIG. 21 is a flow diagram for the filtering messages according to FIG. 20 as performed on a microprocessor-based unit.

When the PC operator starts the Logon process, the normal Internet connection process is started. This is illustrated in FIG. 16. In FIG. 16 block 1623 a message selection filter process is illustrated. FIG. 21 illustrates this message selection process from within the PC. The PC operator starts the Logon process 2103. The present invention calls the table of messages with the associated labels 2105 from the PC cache, block 1139 of FIG. 11. The labels are sorted 2109 per the time of day 2107. The time of day is available from the PC by using the systems clock function 1107 of FIG. 11. This results in a list that is suitable to show for this time of the day, on this date 2111. The present invention then sorts 2115 the list based on the user's preferences 2113. This results in a list of messages that are suitable for this time and suitable with the user 2117. Finally, the message that will be rendered 2123 is selected by the highest revenue 2119 filter 2121.

Referring back to FIG. 16 during the password validation the ISP receives the name of the rendered message 1617 so as to keep track of the messaging revenue for the ISP.

Figure 22:
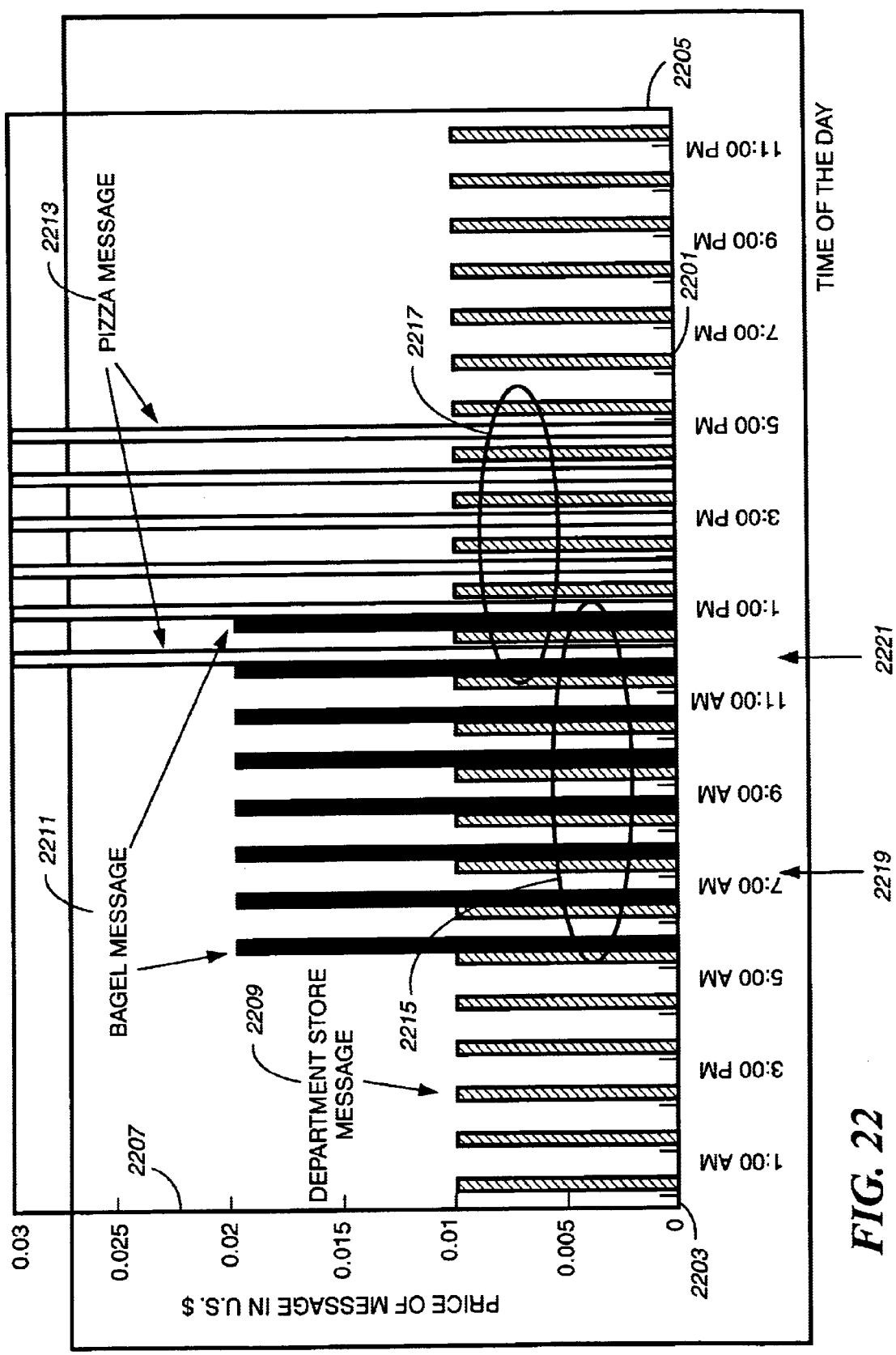
FIG. 22 is a graph of example advertisements plotted over a day with the corresponding message bidding performed on a microprocessor-based unit.

This process of sorting on the messages referenced in FIGS. 10–13, 20 and 21 is described in this embodiment. FIG. 22 is a graph of the bids for placing messages verses the time of day 2200. On the X-axis 2201 the time of day is presented from 12 midnight 2203 through the complete day, till 12 midnight of the next day 2205. On the Y-axis 2207 the cost of placing a message is plotted in US dollars. There are three messages contending for rendering. As plotted the department store will pay $0.01 for a message any time of the day 2209. The Bagel store will pay $0.02 for a message any time between 7:00 AM and 2:00 PM 2211. And a Pizza store will pay for a message $0.03 for times between 1:00 PM and 6:00 PM 2213. Note the overlaps; the Bagel store over laps the Department store between 7:00 AM and 2:00 PM 2215. In addition, the Pizza store over lap both the Bagel store and the Department store between 12:00 Noon and 2:00 PM, and the Pizza store overlaps the Department store from 2:00 PM until 6:00 PM 2217. For illustrative purposes, suppose a computer operator dials on to the Internet at 9:00 AM—as denoted by 2219. In this example, the present invention renders the Bagel store's message because the Bagel store has out bid the Department store for this time period. Once connected, the present invention will have passed along the correct password for user Logon and, in addition, the fact that a Bagel message was placed, the ISP is notified. The ISP can then forward the "hit" or the rendering of the advertisement and debited the Bagel store's account the corresponding $0.02 accordingly.

In a second example of the bidding process, the operator dials on at 2:00 PM—as denoted by 2221. Here there are all three stores have bids. The present invention will filter on the highest bidder and in this example place the Pizza ad over both the Bagel, and Department store ad. (Department store=$0.01, Bagel message=$0.02, Pizza message=0.03). Again, during the connection process, the ad counter for this advertiser, in this example, the Pizza store, is incremented through the ISP.

In another embodiment of the present invention, during the original installation of the application software 1145 and, in fact, during on going usage the PC operator can fill in a message interest template. This is optional, but all of the normal demographic questions are asked. In addition, likes and dislikes are also filled in. In a final example of the present invention filtering during a set up questioner the user filled-in the fact that no Pizza messages are liked. Therefore, this operator would not even have the Pizza message put into the PC if the PC operator prefers not to receive Pizza advertisements. So, at 12:00 PM the present invention would select the Bagel message over the Department store, as it was the highest bid. Note that from the Pizza Company's perspective there would be no wasted messages sent. From the PC operators point the present invention would adhere to the likes and dislikes table that was filled in.

There are many alternate methods and means to embody the present invention. Once the present invention renders the message the interaction with the rendered message may be one of clicking on an Internet message, printing a coupon, dialing a toll free number, remembering a password, selecting a fax message, calling a beeper number, or tuning to a particular radio or TV station. Once rendered, any interaction with the message is within the true scope and spirit of the present invention.

The bidding that was described can take on several alternate methods which includes flat rate, per subscriber rates, per impression, per click through, on a commission of sales, in fact, any interaction with the rendered page can be measured and set up so as to have a bidding process regulate the revenue.

The rendering of the messages and the counting of the events will assure correct revenue to the host, and proper measurement as to the message response. This is very accurate tracking for advertisers.

Alternative Embodiment for Triggering a Message

Figure 23:
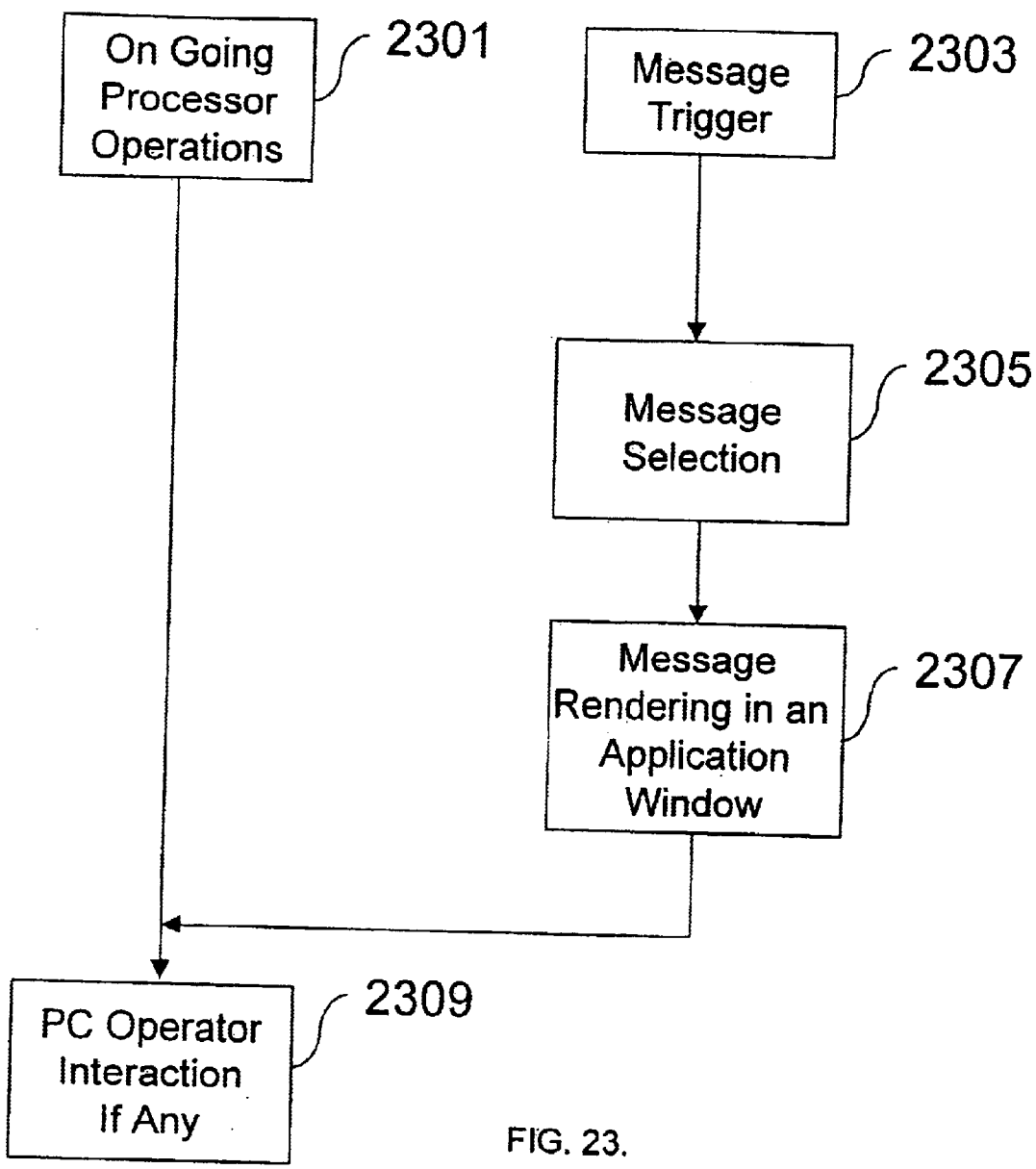
FIG. 23 is a flow diagram of an alternate embodiment of triggering a message according to the present invention.

Times of latency between a user and a data processing system to render messages is described above. However, there are other sources of triggers for rendering messages. A first source is a user initiated event, such as dialing up to the Internet, booting up, shutting down, printing, starting or stopping CD or DVD music, starting or closing an application and other events. A second source is a non-user initiated event, such as news, weather, interests rates, travel booking rates, incoming fax, incoming e-mail, error messages from printers and other attached devices, news and information from other sources external to the user. Turning now to FIG. 23, there is shown a flow diagram of an alternate embodiment of triggering a message according to the present invention. The process flow starts with the information processing system running normal operations, 2303. A message trigger 2303, such as a user initiated event or non-user initiated event, occurs. The message trigger 2303 selects a message based on filtering the information according to users interests as discussed in FIG. 21 above.

In one embodiment, the internal and external sources of triggers along with the time of day, as measured by the user's information processing system, is factored into the message filtering process. For example, if an external information on upcoming inclement weather is received this can trigger different message filtering depending on the time of day the message is received. A snow storm may trigger the filtering of a message advertising a special on pay-per-view television for users snowed-in at home during the night, but the same information received on the snow storm may trigger the filtering of a message advertising snow removal services, if rendered during the daytime.

Figure 24:
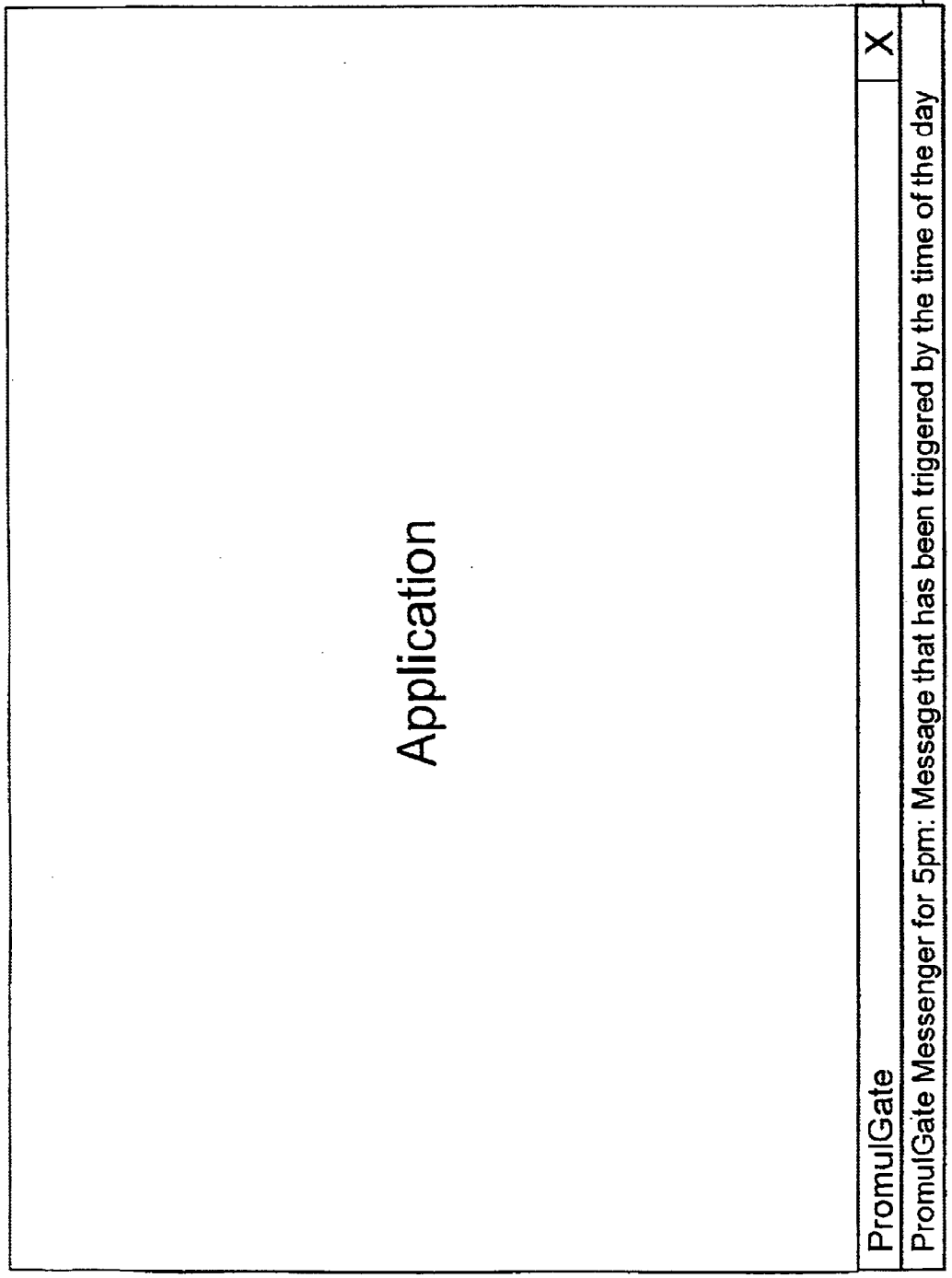
FIG. 24 is an illustration of an application window with a message strip according to the present invention.

After the message is selected 2305, the message is rendered 2307 in a user application window 2400 on communications client 901 as shown in FIG. 24. The user may choose to interact with the message being rendered 2309 such as selecting a button that brings up a predefined URL or the user may simply ignore the message. Examples of interacting with the message will depend on the platform the message is being rendered. For example, the user may select a message by clicking through to an Internet message, printing a coupon, connecting by phone with the sponsor of the message (without disconnecting from the Internet), dialing a toll free number (after logging off from the Internet), remembering a verbal password, selecting a fax message, calling a beeper number, or tuning to a particular radio or TV station.

FIG. 24 is an illustration of a application window 2400 with a message strip 2401 according to the present invention. The message is rendered as a strip 2401 so as to be less intrusive to the user. In an alternate embodiment, the message is rendered in a full page add, such as a screen saver. In still another embodiment, several messages are rendered at the same time on a strip that uses more display area, or in several areas of one full page. When these messages are advertisements, the sponsors of the advertisement may decide to co-brand with a complimentary product such as food and beverage, e.g. pizza and Pepsi. Sponsors may be able to budget for advertisement that occupies only a portion of a page A, as in traditional printed publication advertisement schedules. The rendering of more than one advertisement simultaneously on a single page, enables the sponsors to select different advertisement schedules that meet their budgets.

Alternative Embodiment for Filtering a Message

Figure 25:
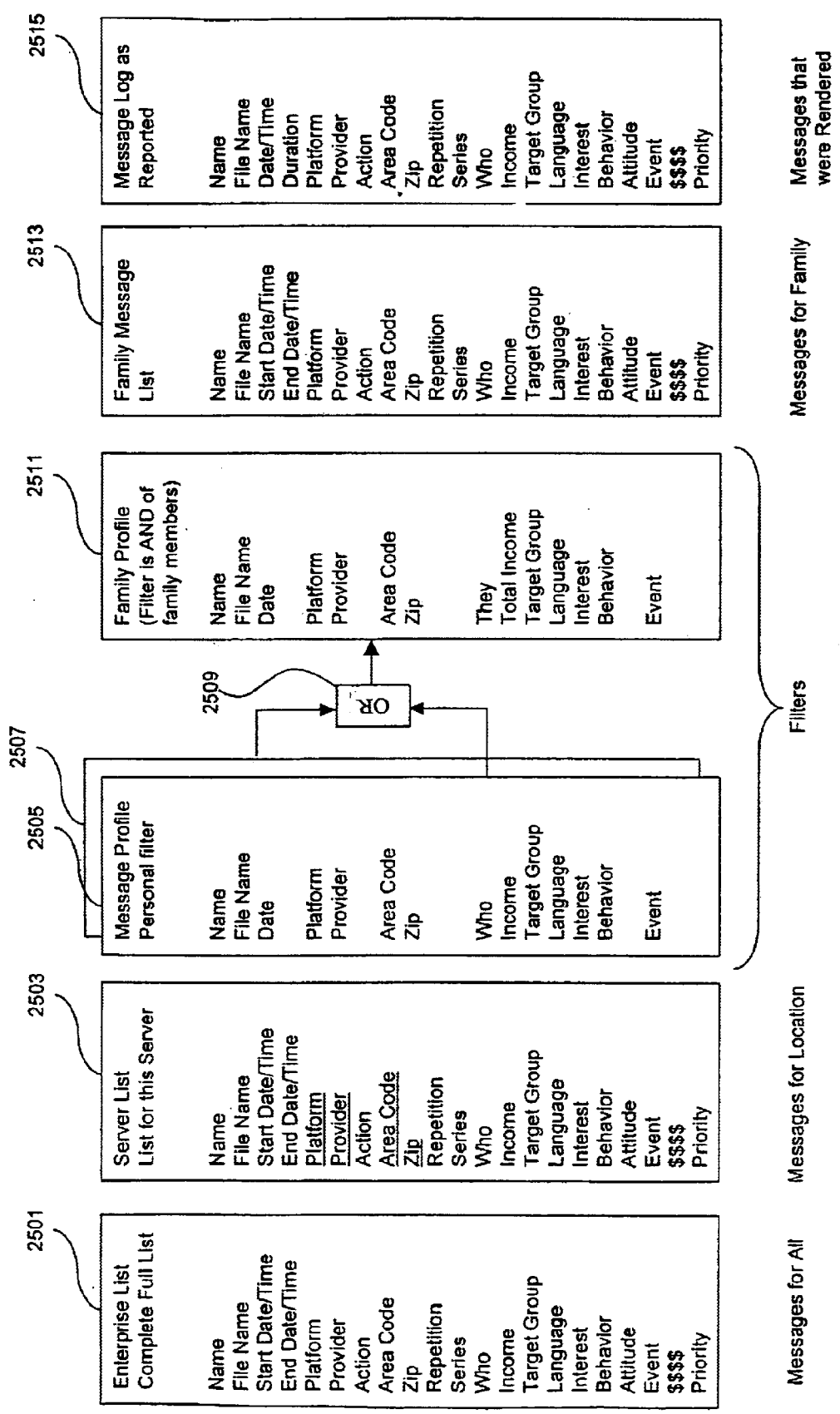
FIG. 25 is a block diagram of the selection tables of an alternate embodiment for filtering according to the present invention.

Turning now to FIG. 25–shown is a series of block diagrams of the selection tables and filters of an alternate embodiment, according to the present invention. There are six lists in this embodiment: an enterprise list 2501, a server list 2503, a Message Profile or Personal filter list 2505 and 2507, the ANDing of these two filters 2509 results in a family filter list 2511, employing this family filter list results in a family message list 2513, and finally, during the course of using the PC, a message log as reported 2515 results.

The enterprise list 2501 contains all messages and associated tags. They are authored and maintained by their respective sponsors.

The Server list 2503 contains all messages and associated tags into a particular geographical area. In addition given a particular technology based server, there is sorting based on the Platform and the Provider. The Provider controls the server, and the platform will identify only messages that are intended for a particular class of devices. (PC & Apples vs cell phones)

The Message Profiles 2505 and 2507 represent filters for two individuals. Note that several attributes are missing from the list of messages. They are the Start Date/Time, End Date/Time, Action, repetition, Series, Attitude, the amount that the sponsor will pay for the message, and Priority. This list does contain a Date for the last time that the filter was updated. This filter and it's attributes will be described in better detail below.

The Boolean inclusive "OR" function 2509, is applied to both family member filters 2505 and 2507. This results in the family filter 2511 and allows for all messages that match either or both family members to be down loaded from the server list 2503 into the family message list 2513, within the family's PC. Finally, during the course of PC usage by the Family certain messages are rendered and thus added to the Message Log 2515.

Turning now to FIG. 26, there is shown table 2600 of the different entries of FIG. 25 block 2503, according to the present invention. Row 2602, lists all of the labels. Row 2604 lists a message from a BookShop. Row 2606 lists a message from a Pizza Shop. Row 2608 lists a message from a Sub Shop. Finally Row 2612 lists a message from a Dept. Store. Each entry in the table will now be discussed and one manner by which each table entry is filled-in described: Each entry in the table will now be discussed and one manner by which each table entry is filled-in described:

Name 2605 is the corporate name. Within the enterprise lists 2501 this points to the legal address, billing address, contact person, and other information about the corporation that is sponsoring the message. The unique Name 2605 is supplied by the author of the entry when posted on the server 905.

Pointer 2610 is a pointer to the message to be rendered. The messages adhere to all of the accepted standards and compatible languages for the intended users and platforms. For example, in a Web browser embodiment, these messages are in some combination of HTML, GIF, TIF, JPG or compatible format. A typical message would be comprised of multiple files, text, graphic, sound and video possibly in a container file. The communication server 905 retrieves these messages using the File Name 2610 over the communications fabric 903, such as the Internet. By using the Pointer 2610, the sponsors of messages can update their messages independently. The communication server 905 retrieves the newest version of a message. Optionally, checks are made to the message for detecting virus and worms, and compatibility with Platform 2625 described below. Moreover, the content of the message is checked to ensure unacceptable content such as smut, hate messages and the like are not used. The communication server 905 may offer all of this checking as a selectable feature. Finally, within the communication client 901, the File Name 2610 may be changed to something very abbreviated. The operator of the communication server 905 fills in this unique File Name 2610 for each sponsor of an associated message. In one embodiment, the File Name 2610 is the actual HTML file that includes the complete message. It is constructed using "normal" HTML with optional URL links, which are "live", once a communication with the Internet 903 is established.

Start Date/Time 2615 is the date and time that the message associated by the File Name 2610 is allowed to be rendered if the message is filtered down to and stored in the Family PC, and selected by the present invention for rendering. The message can be rendered from this Start Date/Time 2615 onward, until the end time is denoted by End Date/Time 2620 for this message. The time as listed is the local time of the communications client 901. The communication server 905 may deliver these messages to the communications client 901 before the Start Date/Time 2615 and any time during the scheduled message period if the client does not have the particular message. It is noted that messages may be targeted for a limited period of time such as only weekdays, or only for Sunday, or the like. The Start Date/Time 2615 is filled in by the sponsor of the associated message.

End Date/Time 2620 is the ending date and time that the message associated by the File Name 2610 is allowed to be rendered if the message is filtered and selected. This ending date and time is also used to purge old messages from the communication client 901. The End Date/Time 2620 is filled in by the sponsor of the associated message.

Platform 2625 is the hardware and software platform a particular message is to be rendered on. For example a message targeted for a PC may be a full multi-media message including video. If a message is rendered on a cell phone it may be a simple audio and/or text based message. The Platform 2625 is filled-in by the sponsor of the message.

Provider 2627 allows the subject invention Service Provider to be identified. This identification is used to identify where the messages are hosted. In addition, when the messages are rendered this field allows the back office to separate the message placement for message billing and reporting.

Action 2630 allows the message sponsor an open-ended definition of when the sponsored message is to be rendered. Several choices are logon, logoff, while down loading (FTP transfer or similar), while printing PC OS start screen, PC OS shut-down screen, etc. The Action 2630 is filled-in by the sponsor of the message "Any" or "similar" is used as a wild card.

Area Code 2635 is the target area code(s) of the users served by the Internet Service Provider. This permits for very specific geographic targeting of the message. In another embodiment, caller ID is used by the ISP to exactly target the user's location. In yet another embodiment, the user's address is filled in. In the enterprise list 2501, this parameter is really a table of the sponsor's targeted area codes. If this field is set to zero it is taken to be a wild card for all area codes. Note that this parameter is stored only if it is required by the sponsor in the ad log report on the communication client 901. The sponsor of the message or the owner of the server list 2503 can fill in the Area Code 2635.

Zip Code 2640 is the zip code of the target user for use in demographic filtering and message targeting. The Zip Code 2640 in the enterprise list 2501 is a geographic designation of the sponsor's targeted audience for the message. If the Zip Code 2640 is set to zero it is taken to be a wild card for all zip codes. In order to cover a wide area the Zip Code 2640 may be a list of zip codes or contain wild card character "X" such as 334XX or 33XXX. The sponsor of the message or the owner of the server list 2503 can fill in, the Zip Code 2640.

Repetition 2645 is used by the sponsor of the message to identify the level of repetition for a particular message. Example parameters include once; meaning once this message is shown the message is deleted. The next parameter is once/per day M; meaning messages are rendered, subject to the message being filtered and selected, but not more that once in any 24-hour period, as defined by the local time of a communication client 901. Another parameter is always. The message is rendered each and every time it is filtered and selected. The Repetition 2645 is filled-in by the sponsor of the message.

Series 2650 is used by the sponsor of the message to identify the message and is one of an ordered series. As an example, there is a first message or advertisement that sets up a common problem, and does not supply the solution. For example, the current Microsoft Corporation advertisement: Where do you want to go today? At a later time the answer to the problem is presented. In this example the table entries for these two series of messages would be 1 of 2 and 2 of 2. Any other number can be used to define a series: for example 1 of 3, 1 of 9, and more. The Series 2650 is filled-in by the sponsor of the message.

Who 2655 is used to identify the intended target for the message. From the communication client 901 the identity of the person making the connection is being targeted. In other words, during signing on the user must select on dad, mom, son or daughter. In an alternate version the user may actually supply the exact identity or user's name. As a user voluntarily enters this information, the messages can be targeted to a specific individual. In addition, there are several other general labels such as male, female, teenager, retired, and more. The wild card for this field is Any. There are several related entries to Who 2655. Additional entries in Table 2600 below include: Income 2660, Target Group 2665, Language 2670, Interests/Disinterests 2675, Behavior 2680 and Attitude 2685, which are related to a particular user of the communication client 901. Who 2650 can be filled in by the sponsor of the message, or the owner of the server list 2503.

Income 2660 is used by the sponsor of the message to target the income level of the user. The amount of yearly income can be granularized into predefined dollar levels such as 10,000 dollar increments. The messages can be targeted and filtered to the level of income. The wild card for this field is Any. The sponsor of the message, or the owner of the server list 2503, can fill in the Income 2660.

Target Group 2665 is used by the sponsor of the message to focus on a member of a particular sub group for message delivery. This parameter is really freeform and will precisely match if the user volunteers to "join" one of the target groups using the personal filter 2505 described below. An example would be Canadians living in Florida. Note that this is not the same as the language of the user but is does present certain targeting opportunities for the message sponsor. Several target groups may be found within this field 2665. An example would be French Canadian AND Age Group is 20–30 years old AND Special Needs diabetic, where AND is a Boolean operator. The wild card for this parameter is Any. The Target Group 2665 can be filled in by the sponsor of the message, or the owner of the server list 2503.

Language 2670 is simply the targeted national language. It may or may not be the language that is used for the message. In this case the parameter is simply the name of the language; for example: Latin American Spanish or Spanish. The wild card for this parameter is Any. Although is may be possible to have a large portion of the message as logos and pictures, even these pictorial symbols may need to be targeted to a specific user. For example, a Spanish speaking subscriber may expect the logo style and caption to be converted to Spanish. The Language 2670 can be filled in from a variety of sources, by the sponsor of the message, or the owner of the server list 2503.

Interest/Disinterest 2675 is a parameter that helps the sponsor target users with like interests. Examples would be computers, music, travel, fast food, hobbies and others. The wild card Any would allow a match in very general interests such, as soft drinks. The Interests/Dis-Interests 2675 can be filled by the sponsor of the message, or the owner of the server list 2503.

Behavior 2680 is the tracking of the actual user behavior. It is important to distinguish between Interests/Disinterests 2675 and behavior 2680. Interests/Disinterests 2675 selected may not match up with actual Behavior 2680. For example, a user may indicate that they are interested in cars, but is actually shopping online for pick-up trucks. The Behavior 2680 can be derived by an application running on the communications client 901, which examines the log file or cookie file of a particular browser to understand what types of sites the user normally visits. Alternatively the ad server can query the cookie list. In one embodiment, the user is asked if he wants his/her behavior tracked.

Attitude attribute 2685 is used by a sponsor to work with the selection data base engine in the client if the user supplies their attitude as they are signing on during Logon on to the communications client 901. In one embodiment, the user selects a catchy phrase such as I want to "_____" where the blank line denotes and attitude. For example, "I want to eat" may provide a lists of delivery services for food. "I want to travel" may provide information on air, lodging car rental and other travel information. "I want to shop" may provide information on types of products to purchase. "I want to go home" may provide information on take out services for food, dry cleaning, and other errands normally made on the way home from work. In one embodiment, a quick printable coupon as part of a message may be presented by a particular sponsor. The wild card here is "Any". It is also noted that attitudes may be selected for a period of time. An example clarify the difference between Interest/Disinterest 2675 and Attitude 2685 would be a user who is interested in automobiles. This interest is general and may cause blanket messages by automobile agencies. However, if the user selects "I want to buy a vehicle", the ability for auto dealers to spend their message dollars is excellent, as the user has put up a target. This targeting is far better than messages placed in each and every newspaper. In addition unlike the newspaper, the user, once connected, can go to the source of a given message for further information and buy.

Event 2690 is used to track specific events such as weather, interest rates, travel rates, and other triggers, as defined by the sponsor. This information allows messages to be event driven during any of the Actions as listed under 2630. For an example, an event can trigger a message during (i) a given session; (ii) the next logoff or (iii) the next Logon, depending on the value set for the Action 2630 parameter. An example might be that a department store would supply a message for snow shovels, but only if the weather outlook is for snow. During a given Internet session the Event 2690 table entry is updated with new weather information. A message is then triggered by this event as defined by sponsor.

Price 2695 is the relative unit value paid for the placement of the message when the message is filtered and rendered. There is no wild card but a minimum price per impression will be in place. It is also noted that the message sponsor can change the bid up or down without changing the message. The sponsor of the message fills in the Price 2695 entry.

The owner of the server list fills in priority 2697. This table entry is used as a tiebreaker if two or more messages have many of the identical table entries. More information on how this entry operates is described in the following section.

Figure 27:
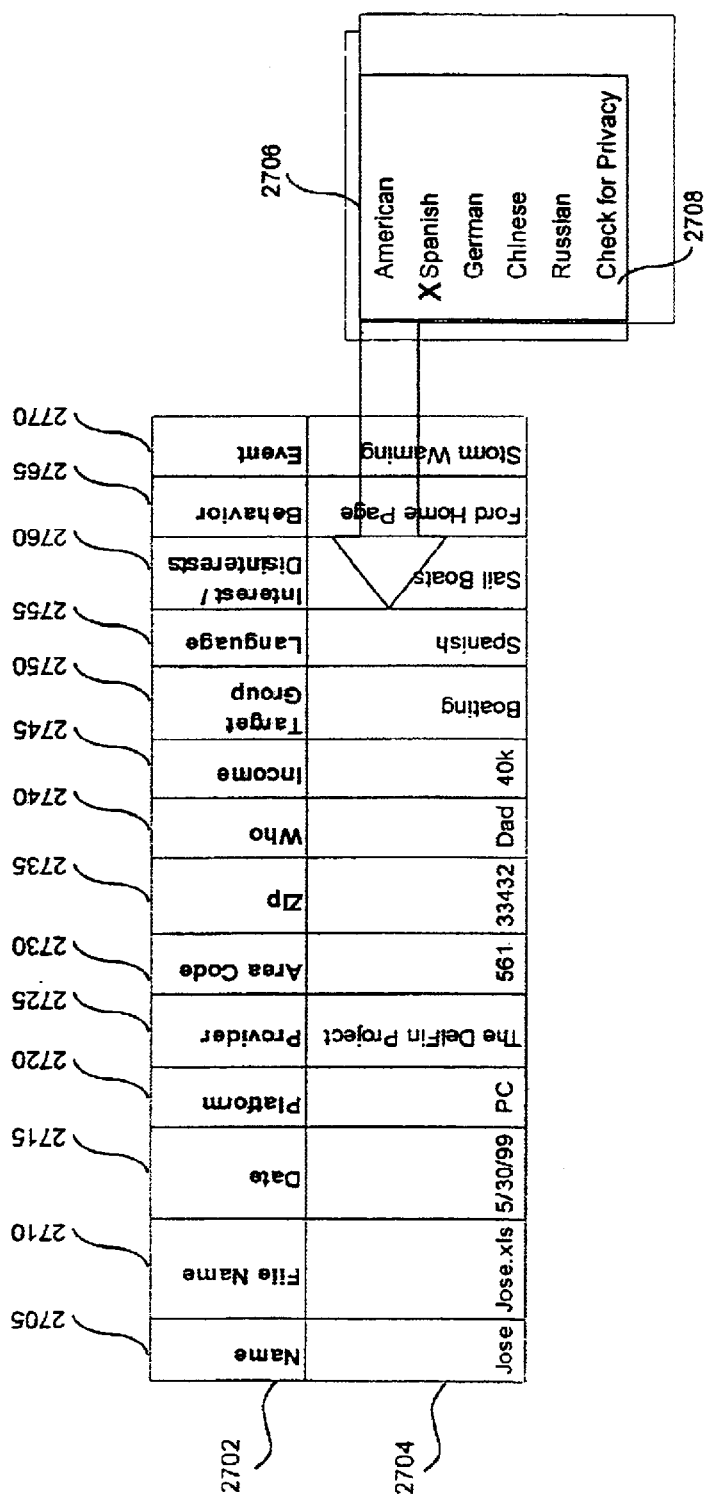
FIG. 27 is a table of a subscriber's profile list according to the present invention.

Turning now to FIG. 27, there is table 2700, which is a subscriber's profile filter. Row 2702 contains the table's labels. Row 2704 contains the entries for Jose, in this example. The intention here is for the subscribers to better identify themselves in a way that is very particular and yet provides for extreme privacy, if that is desired. The subject invention also provides for the filling in of this information to happen over time so as to not burden the subscriber or cause quick selection vs. correct ones. For example, every time a subscriber logons to the Internet a simple question is asked, and may, in fact, have a reward for filling in the question. Once completed over several sessions the normal messaging starts. In addition the subscriber has the ability to update the profile filter over time.

The Name 2705 is the name of the subscriber's if given.

The Account Number, 2710 is the computer identifier for this subscriber's filter.

The date 2715 is the date of the last time the subscriber updated the profile.

The Platform 2720 is the type of platform that the subscriber is using for this particular list.

The Provider 2725, is the name of the provider of the messages for this list. The subscriber may have several providers; this allows different filters based on a particular point of access to cyber space.

The Area Code 2730 field is filled in with the access provider's phone number, as it is assumed that the user is dialing a toll free number. It is part of the user profile, and once an ad is rendered the area code is attached to the ad log.

The Zip Code is 2735 field is known if provided by the subscriber.

The Who 2740 field is actually several fields containing personal information such as age, gender, address, etc. Some users may elect not to fill in this information due to privacy concerns. One aspect of this invention that the user may fill in all of this information, but if the Privacy 2708 is checked then the ad log that is reported will contain ONLY the known fields such as: the message Pointer 3010, the Area Code 3035, the Date/Time 3015 that the message was rendered, the Duration 3020, and the Price 3095. The Who 2740 field would be empty.

The Income 2745 field is the subscriber's approximate yearly salary supplied by the subscriber.

The Target Group 2750 can contain several groups. For example one may be diabetic, and like sailing.

The Language 2755 is simply the language that the subscriber would like the messages in. In FIG. 27, note that this field is being filled in using a drop down menu. In this example, Jose has checked Spanish. Also note that he has elected not to check for Privacy. This will allow any ad that is rendered to be reported back with this information.

Interest/Disinterest 2760 is a list of topics that the user can check of as being interested, not interested, or neutral.

The Behavior 2765 is a user profile as to the places that a user has visited. Note that this field can be used by the subject invention for targeting messages. If the user checked the Privacy 2701 box, then this information is not reported, and therefore unavailable.

The Event 2770 field contains any event that may trigger a message. An example would be a message that is to be triggered by a low interest rate for mortgages.

Turning now to FIG. 28, which contains table 2800: the Family Message list. This is simply a Boolean inclusive "OR" of all family members. Row 2802 lists the labels of the table. Row 2804 lists the entries for Jose. Row 2806 lists the labels for Marie. Finally, Row 2808 lists the entries for the Family list.

Column 2805, on the lower left, is labeled Family. Note that in this example, Marie and Jose are the family.

The File Account Number 2810 is the identifier that associates the computer with its profile, and is used by the data base engine to look for matches from the server for down loading into this PC.

The Date 2815 is the latest of any family members. Jose was last updated on May the 30 1999, whereas Marie's was adjusted on August the 13, 1999.

The Platform 2820 is the PC. This is required for forward storing from the Internet, as it separates PC users from, for instance, Apple platforms. This field is also required for Ad placement logging.

The Provider 2825 is the name of the provider of the messages for this list.

The Area Code 2830 is the same as the family members, but is required for forward storing from the Internet and for Ad placement logging.

The Zip Code 2835 is the same as the family members, but is required for forward storing from the Internet and for Ad placement logging.

The Who 2840 is the Boolean inclusive And for both "Dad and "Mom". Listed here is Family; this allows the advertisers to be able to target this particular family and down load all "correct" messages. These messages will be used to select from by the present invention for rendering based on the selection methods.

The Income 2845 is the summation of all family members. In this example, their family income is 60 k.

The Target Group 2850 is the Boolean inclusive "OR" of each entry for both Jose and Marie. This parameter is freeform, and will match if the user(s) volunteers to "join" one of the target groups. In this example, any message with a tag of Tennis or Boating is downloaded to the PC. They are only stored in the PC, the rendering of a particular message depends on who signed on to the PC.

The Language 2855, is the Boolean inclusive "OR" of each entry for both Jose and Marie. Note that in this example, both Spanish and French are listed. Messages may be down loaded in other languages such as English, but for best targeting the advertisers would choose the two listed.

Interest/Disinterest 2860 is the Boolean inclusive "OR" of each entry for both Jose and Marie. In this example, both Sailboats and Jogging messages would be welcome.

Behavior 2865 is the aggregated list of past Internet pages that both Jose and Marie have visited in recent history. This is also known as the list of cookies.

The Event 2870 is a list of available events that can be monitored, and with a match, cause a very compelling message. In this example, Jose has listed Storm Warnings.

Turning now to FIG. 29: the Family Ad List for Jose and Marie. Row 2902 lists the labels of the table. Row 2904 lists the entries for Dad, and Row 2906 lists the entries for anyone. This very simple list of two messages illustrates what the PC has down loaded during a given Internet session from the Server Ad List Table 2600. Note that the down loading is really a caching scheme. Therefore, only updates need to be down loaded, and old, out of date messages are deleted.

The Name field 2905 lists a bookshop and a department store message.

The File Name 2910 lists the corresponding file names. Note that the BookShop has a Spanish ad message, and that the Department store lists an ad for Joggers in French.

The Start Date/Time 2915 lists the date and time of the day after which a given message may be rendered, if selected.

The End Date/Time 2920 lists the date and time of the day after which the particular message will not be rendered, and, in fact, is deleted.

The Platform 2720 is the type of platform that the subscriber is using for this particular list.

The Provider 2725 is the name of the provider of the messages for this list.

The Action 2930 lists that the BookShop message shall be rendered only during logon, and may not be selected during logoff. Whereas, the Department Store message may be selected for rendering during any message opportunity, such as logon or logoff, etc.

The Area Code 2935 lists 561 for the BookShop message, and "0" for the department store. The BookShop is targeting a particular geography, whereas the department store has an national ad.

The Zip Code 2940 lists 22432 as a particular targeted zip for the book store, further tuning the geography filter, whereas the department store, has the wild card "0".

The Repetition 2945 lists once for the BookShop. If selected this message will be rendered only once and then after reporting this event it will be erased, whereas the Department store message will be rendered each and every time it is selected, and not deleted until after the end date/time limit is reached.

The Series 2950 lists 1 of 3 for the BookShop. This message is, in fact, one of a series and will be shown in strict order, whereas the department store message is a simple unique message.

The Who 2955, filed for the book store, lists Dad as the intended target. During logon, if "Dad" in not the one logging on, then this message will not be selected, whereas the department store lists "any" for the Who filed. Therefore, the message will be rendered for anyone that logons on to the Internet.

The Income 2960 lists 40 k and 20 k for the BookShop and department store messages. It is noted that this field was used for selection and storage into this family computer. This information may or may not be used for selection during an Internet session, and also for reporting back to the sponsor. Note that the messages are intended for any one with an income of 20 k or higher for the department store, and 40 k or higher for the BookShop. As their family income was 60 k, the messages were down loaded for possible rendering.

The Target Group 2965 lists Boating, as this bookstore message is about boating, whereas the department store message is about jogging.

The Language 2970 lists the respective languages for the two messages. Note that although there is a language match here, there may be some messages that a universal language such as certain seasonal messages, that requires no words.

The Interest/Disinterest 2975 lists Boats for the BookShop. The Department Store lists Jogging. This field is very powerful, and if matched has a high affinity for click through and purchasing.

The Behavior 2980 lists two sites; Amazon for the book store and Nike for the Department store. The two advertisers are further tuning their ad campaigns. In the case of the bookstore, they are targeting people who frequent the on line book store Amazon. In the case of the department store, they are focusing in on people who visit the Nike home page.

The Attitude 2985 lists the preferred attitude of the intended ad viewer when they sign on to or off from the Internet. In the case of the bookstore the preferred attitude is that of wanting to go shopping, whereas, the department store lists "any" as a wild card.

The Event 2990 lists any external events that may trigger a higher propensity for buying based on the rendering of a message that is rendered. In the case of the bookstore, a weather related storm warning may cause increased book sales. In the case of the department store, the sponsor lists "no" as the wild card for events.

The $$$$ 2995 lists the amount of money that a sponsor would like to bid on placing the message, if it passed all of the previous selection attributes. The BookShop has bid 3 cents and the department store has bid 6 cents. It is also noted that the bid may, in fact, be a function of the degree of matching between a given message and the user profile. In this example, the book store may bid 3 cents for a normal rendering, however, if there is an event driven storm warning trigger that the bid may go to 7 cents which would out bid the department store.

The Priority 2997 lists the priority that has been assigned to a particular sponsor. The bookstore has a higher priority of 2 verse 3, however in this example, the department store would always win as they are bidding 6 cents verses 3.

Turning now to FIG. 30, Message Log as Reported, contains Table 3000. Row 3002 lists the labels for this table. Row 3004 lists the BookShop Message, and the tags that are allowed to be reported. Finally, Row 3006 lists the Dept Store Message, and the tags that are allowed to be reported. These two messages represent the logon-on message that started this particular Internet session, and the log-off messages of the previous session. Normally, during each Internet session, this file is transferred back to the ad server, for timely ad response and revenue. After the ad log has been received at the ad server, the ad log is erased at the client. It is possible for someone to have a very short Internet session during which messages were presented, but the ad report was terminated. The next session will then contain four messages.

Name 3005 is the corporate name. The two messages that have been selected and rendered are BookShop and Department Store.

Message ID 3010 is the unique identifier for the message that was rendered.

Date/Time 3015 is the date and time that the message was rendered. Note that the BookStore message has the current date and approximate time for rendering, as this message was rendered during logon. However, the Department Store message was rendered during logoff on the previous Internet session.

Duration 3020 is the time, in seconds, that the message was rendered. That is, it is the time from when the message was completely rendered until an Internet session was connected. If the message is rendered during logoff then it is the time between the completion of rendering until the user closes the browser window.

Platform 3025 name of the name of hardware and software platform a particular message is to be rendered on. In this example it was a PC platform.

Provider 3027 is the name, or number, of the provider of the messages. In this example it is The DelFin Project, Inc. This tag is used at the ad server to total up all such ads that have been deployed from, and rendered at, the computers of the subscribers of this provider.

Action 3030 is the process during which the Process that was happening when the messages were being rendered. In this example the BookShop message was rendered during logon and the Department Store's message was rendered during the previous session's logoff.

Area Code 3035 is the local or least expensive area code of the Internet Service Provider. In this example both messages were tagged with 561.

Zip Code 3040 is the zip code of the family PC. Note that although it has been filled in here as 33432, if the subscriber clicked on privacy, then this field would be all zeros. Nevertheless, the sponsor would know because of the area code the approximate location of the placement of the ad.

Repetition 3045 lists the fact that the BookShop's message shall be shown once, and after this rendering it will never be rendered again. It may be available for viewing if a subscriber would like to lookup this message. The Department Store's message is shown every time it is selected, and will not be deleted until the Stop date and time has been exceeded.

Series 3050 lists the number in the series of messages that it may be from. In this example, both message are the first. That is the BookShop is 1 of 3, and the Department Store is 1.

Who 3055 lists Jose as the viewer of the BookShop message, and Marie for the Department Store message. The only way that this is know is if the subscriber's dial-on to the Internet as themselves. Note that this field may have been checked for privacy, and therefor it would contain no information.

Income 3060 has both fields filled in by an "X". This is because although both Jose and Marie filled in these fields for attracting certain types of messages, they did not want to allow their income level to be reported. It is noted that the sponsor of the messages is assured that the targeting income levels were hit, they, however, cannot identify Jose and Marie, as their privacy is being maintained.

Target Group 3065 is also filled in by an "X". As with income, Jose and Marie have chosen to have privacy, and not be listed as part of any Target Group.

Language 3070 has Spanish filled in for the BookShop message, whereas the Department Store has an "X" for Language. It is noted that the message may, in fact, be multilingual key here is what is the language of the view. The ad log will only report on information that is allowed to be public.

Interest/Disinterest 3075 has been filed in with "X". Both Jose and Marie have chosen to be private with this information.

Behavior 3080 has been filled in with "X" for both messages, as both Jose and Marie have chosen to be private with their past surfing habits.

Attitude 3085 has been filled in with shopping for the BookShop message. Jose has signed on as himself and did select an attitude of, "I want to go shopping". He has also elected to allow this to be public. Marie's attitude during the time that she viewed The Department Store message is not known. It may be that she elected to be private, or it may be that she simply disconnected from the Internet with no attitude selected.

Event 3090 is filled in for both The BookShop message and the Department Store message. In this example, neither was tied to an event that occurred.

Price 3095 has been filled in at 3 cents for The BookShop message, and 6 cents for the Department Store message. The two message sponsors fill in Priority 3097 as 2 and 3 for viewing. In an alternative example, the message server may elect not to have the message sponsors know their priority.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method to filter messages for rendering on a client information processing system comprising the steps of:
   creating a list of at least one message;
   associating one or more criteria for the message;
   downloading the message from at least one server information processing system to a client information processing system for subsequent rendering of the message;
   selecting the message to be rendered based on the criteria;
   rendering the message selected when disconnected from communicating with the server information processing system, whereby the rendering of the message is triggered by a user initiated event selected from the group of user initiated events of dialing up to a network, connecting to a broadband connection, starting-up, shutting-down, printing, starting a removable computer readable medium, and stopping a computer readable medium; and
   generating a report of the message rendered whereby the report contains the criteria used for selecting the message based upon one or more settable privacy flags, so that what one of the privacy flags is set for reporting, the report generated contains at least a portion of the one or more criteria for selecting the message, and when one of the privacy flags is set for not reporting, then the report generated does not include the portion of the one or more criteria for selecting the message.

2. The method according to claim 1, wherein the step of associating one or more criteria of the message include associating a postal code, or area code of a targeted viewer of the message.

3. The method according to claim 1, wherein the step of associating one or more criteria of the message include associating an age or a gender of a recipient of the message.

4. The method according to claim 1, wherein the step of associating one or more criteria of the message include associating a time period in which to target a recipient of the message.

5. The method according to claim 1, wherein the step of associating one or more criteria of the message include associating a behavior of a targeted recipient of the message.

6. The method according to claim 1, wherein the step of associating one or more criteria of the message include associating a type of man-machine latency that the message should be rendered.

7. The method according to claim 1, wherein the step of associating one or more criteria of the message include associating a type of platform that the message should be rendered.

8. The method according to claim 1, wherein the step of associating one or more criteria of the message include associating one or more interests defined by a targeted recipient.

9. The method according to claim 1, wherein the step of associating one or more criteria of the message include associating an event on which the message should be rendered.

10. The method according to claim 1, wherein the step of associating one or more criteria of the message include associating a price of the message to be rendered.

11. The method according to claim 1, wherein the step of associating one or more criteria of the message include associating a priority of the message to be rendered and wherein the step of selecting includes using the priority of the message selected to choose a message when more than one message shares the identical criteria.

12. A method to filter messages for rendering on an information processing system comprising the steps of:
   creating a list of at least one message;
   associating one or more criteria for the message;
   selecting one or more servers to send the list of messages based on the criteria of the message;
   sending the message to one or more servers;
   selecting one or more clients to send the list based on the criteria of the message;

sending the message to one or more clients;

selecting the message to be rendered based on the criteria;

rendering the message selected on one or more clients rendering the message selected when disconnected from communicating with the servers;

whereby the rendering of the message is triggered by a user initiated event during a time of latency when the user is waiting for the initiated event to complete;

whereby the user initiated event is selected from the group of user initiated events of dialing up to a network, connecting to a broadband connection, starting-up, shutting-down, printing, starting a removable computer readable medium, and stopping a computer readable medium; and generating a report of the messages rendered on one or more clients to at least one provider of the message, whereby the report contains the criteria used for selecting the message based upon one or more settable privacy flags, so that when one of the privacy flags is set for reporting, the report generated contains at least a portion of the one or more criteria for selecting the message, and when one of the privacy flags is set for not reporting, then the report generated does not include the portion of the one or more criteria for selecting the message.

13. The method according to claim 12, wherein the provider of the message is one of:

a content provider;

an advertising agent; and an ISP.

14. The method according to claim 12, wherein the step of associating one or more criteria includes associating one or more criteria which is not reported to the provider of the message.

15. A computer readable medium containing program instructions to filter messages for rendering on client information processing system comprising the instructions of:

creating a list of at least one message;

associating one or more criteria for the message;

selecting the message to be rendered based on the criteria;

whereby the rendering of the message is triggered by a user initiated event during a time of latency when the user is waiting for the initiated event to complete;

whereby the rendering of the message is triggered by a user initiated event selected from the group of user initiated events of dialing up to a network, connecting to a broadband connection, starting-up, shutting-down, printing, starting a removable computer readable medium, and stopping a computer readable medium; and;

generating a report of the messages rendered on one or more clients to at least one provider of the message, whereby the report contains the criteria used for selecting the message based upon one or more settable privacy flags, so that when one of the privacy flags is set for reporting, the report generated contains at least a portion of the one or more criteria for selecting the message, and when one of the privacy flags is set for not reporting, then the report generated does not include the portion of the one or more criteria for selecting the message.

16. The computer readable medium according to claim 15, wherein the instruction of associating one or more criteria of the message include the instruction of associating a postal code, or area code of a targeted viewer of the message.

17. The computer readable medium according to claim 15, wherein the instruction of associating one or more criteria of the message include the instruction of associating an age or a gender of a targeted recipient of the message.

18. The computer readable medium according to claim 15, wherein the instruction of associating one or more criteria of the message include the instruction of associating a time period in which to target a recipient of the message.

19. The computer readable medium according to claim 15, wherein the instruction of associating one or more criteria of the message include the instruction of associating a behavior of a targeted recipient of the message.

20. The computer readable medium according to claim 15, wherein the instruction of associating one or more criteria of the message include the instruction of associating a type of platform that the message should be rendered.

21. The computer readable medium according to claim 15, wherein the instruction of associating one or more criteria of the message include the instruction of associating an event on which the message should be rendered.

22. The computer readable medium according to claim 15, wherein the instruction of associating one or more criteria of the message include the instruction of associating a price of the message to be rendered.

23. The computer readable medium according to claim 15, wherein the instruction of associating one or more criteria of the message include the instruction of associating a priority of the message to be rendered and wherein the instruction of selecting include the instruction of using the priority of the message selected to choose a message when more than one message shares the identical criteria.

24. A computer readable medium containing program instructions to filter messages for rendering on an information processing system comprising the instructions of:

creating a list of at least one message;

associating one or more criteria for the message;

selecting one or more servers to send the list based on the criteria of the message;

sending the message to one or more servers;

selecting one or more clients to send the list of message based on the criteria of the message;

sending the message to one or more clients;

selecting the message to be rendered based on the criteria;

rendering the message selected on one or more clients;

generating a report of the messages rendered on one or more clients to at least one provider of the message, whereby the report contains the criteria used for selecting the message based upon one or more settable privacy flags, so that when one of the the privacy flags is set for reporting, the report generated contains at least a portion of the one or more criteria for selecting the message, and when one of the privacy flags is set for not reporting, then the report generated does not include the portion of the one or more criteria for selecting the message.

25. A client information processing system to filter out messages for rendering on said system comprising:

a list of at least one message;

a tag for associating with one or more criteria to the message;

means for selecting the message to be rendered based on the criteria on the tag;

means for rendering the message selected when disconnected from communicating with the server information processing system, whereby the rendering of the message is triggered by a user intiated event selected from the group of user initiated events of dialing up to a network, connecting to a broadband connection, starting-up, shutting-down printing, starting a removable computer readable medium, and stopping a computer readable medium; and a report generated of the messages rendered on one or more clients to at least one provider of the message, whereby the report contains the criteria used for selecting the message based upon one or more settable privacy flags, so that when one of the privacy flags is set for reporting, the report generated contains at least a portion of the one or more criteria for selecting the message, and when one of the privacy flags is set for not reporting, then the report generated does not include the portion of the one or more criteria for selecting the messages.

26. The system according to claim 25, wherein the tag for associating one or more criteria of the message include a postal code, or an area code of a targeted viewer of the message.

27. The system according to claim 25, wherein the tag of associating one or more criteria of the message include an age or a gender of a targeted recipient of the message.

28. The system according to claim 25, wherein the tag of associating one or more criteria of the message include a time period in which to target a recipient of the message.

29. The system according to claim 25, wherein the tag of associating one or more criteria of the message include a behavior of a targeted recipient of the message.

30. The system according to claim 25, wherein the tag of associating one or more criteria of the message include a type of man-machine latency that the message should be rendered.

31. The system according to claim 25, wherein the tag of associating one or more criteria of the message include a type of platform that the message should be rendered.

32. The system according to claim 25, wherein the tag of associating one or more criteria of the message include one or more interests defined by a targeted recipient.

33. The system according to claim 25, wherein the tag of associating one or more criteria of the message include an event on which the message should be rendered.

34. The system according to claim 25, wherein the tag of associating one or more criteria of the message include a price of the message to be rendered.

35. The system according to claim 25, wherein the tag of associating one or more criteria of the message include a priority of the message to be rendered and wherein the tag of selecting includes using the priority of the message selected to choose a message when more than one message shares the identical criteria.

36. A information processing system to filter messages for rendering on said system comprising:

a list of at least one message;

a tag for associating one or more criteria to the message;

at least one server selected for receiving the list based on the criteria of the message;

at least one client selected for receiving the list based on the criteria of the message from the server selected, wherein the client received the list, the client selects the message to be rendered based on the criteria;

means for rendering the message selected when disconnected from communicating with the server, whereby the rendering of the message is triggered by a user inflated event selected from the group of user initiated events of dialing up to a network, connecting to a broadband connection, starting-up, shutting-down, printing, starting a removable computer readable medium, and stopping a computer readable medium and a report generated of the messages rendered on one or more clients to at least one provider of the message, whereby the report contains the criteria used for selecting the message based upon one or more settable privacy flags, so that when one of the privacy flags is set for reporting, the report generated contains at least a portion of the one or more criteria for selecting the message, and when one of the privacy flags is set for not reporting, then the report generated does not include the portion of the one or more criteria for selecting the message.

* * * * *

UNITED STATES PATENT AND TRADEMARK OFFICE
CERTIFICATE OF CORRECTION

PATENT NO. : 6,708,203 B1
DATED : March 16, 2004
INVENTOR(S) : Michael G. Makar et al.

It is certified that error appears in the above-identified patent and that said Letters Patent is hereby corrected as shown below:

Column 26,
Line 14, change "what one" to -- when one --

Column 27,
Line 36, change "on client" to -- on a client --
Lines 41 thru 50, delete text and replace the following:

downloading the message from at least one server information processing system to a client information processing system for subsequent rendering of the message;
    rendering the message selected when disconnected from communicating with the server information processing system, whereby the rendering of the message is triggered by a user initiated event selected from the group of user initiated events of dialing up to a network, connecting to a broadband connection, starting-up, shutting-down, printing, starting a removable computer readable medium, and stopping a computer readable medium; and Column 28,
Line 44, add the following at the end of line:

when disconnected from communicating with the servers;
    whereby the rendering of the message is triggered by a user initiated event during a time of latency when the user is waiting for the initiated event to complete;
    whereby the rendering of the message is triggered by a user initiated event selected from the group of user initiated events of dialing up to a network, connecting to a broadband connection, starting-up, shutting-down, printing, starting a removable computer readable medium, and stopping a computer readable medium; and

UNITED STATES PATENT AND TRADEMARK OFFICE
CERTIFICATE OF CORRECTION

PATENT NO.    : 6,708,203 B1
DATED         : March 16, 2004
INVENTOR(S)   : Michael G. Makar et al.

It is certified that error appears in the above-identified patent and that said Letters Patent is hereby corrected as shown below:

<u>Column 29,</u>
Line 4, change "shutting-down" to -- shutting-down, --

<u>Column 30,</u>
Line 23, change "inflated" to -- initiated --

Signed and Sealed this

Twenty-ninth Day of June, 2004

JON W. DUDAS
*Acting Director of the United States Patent and Trademark Office*